United States Patent
Duan et al.

(10) Patent No.: US 11,231,938 B2
(45) Date of Patent: Jan. 25, 2022

(54) PARAMETER CONFIGURATION METHOD FOR A DISPLAY DEVICE HAVING A PLURALITY OF DRIVERS FOR EACH CONNECTED COMPONENT

(71) Applicants: Beijing BOE Display Technology Co., Ltd., Beijing (CN); BOE Technology Group Co., Ltd., Beijing (CN)

(72) Inventors: Xin Duan, Beijing (CN); Hsinchung Lo, Beijing (CN); Jieqiong Wang, Beijing (CN); Ming Chen, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/768,130

(22) PCT Filed: Jan. 16, 2019

(86) PCT No.: PCT/CN2019/072034
§ 371 (c)(1),
(2) Date: May 29, 2020

(87) PCT Pub. No.: WO2019/192244
PCT Pub. Date: Oct. 10, 2019

(65) Prior Publication Data
US 2020/0310827 A1    Oct. 1, 2020

(30) Foreign Application Priority Data
Apr. 3, 2018 (CN) .......................... 201810292085.3

(51) Int. Cl.
*G06F 9/4401* (2018.01)
*G06F 3/147* (2006.01)

(52) U.S. Cl.
CPC ............ *G06F 9/4411* (2013.01); *G06F 3/147* (2013.01)

(58) Field of Classification Search
CPC ............................... G06F 9/4411; G06F 3/147
See application file for complete search history.

(56) References Cited

U.S. PATENT DOCUMENTS

| 10,416,653 B2 * | 9/2019 | Maeda ............... G05B 19/4083 |
| 2005/0086560 A1 * | 4/2005 | Okeda ................... G06F 11/004 714/11 |
| 2006/0253838 A1 * | 11/2006 | Fujii ................... G06F 9/44505 717/124 |

FOREIGN PATENT DOCUMENTS

| CN | 202711659 U | 1/2013 |
| CN | 104461649 A | 3/2015 |

(Continued)

OTHER PUBLICATIONS

International search report of PCT application No. PCT/CN2019/072034 dated Apr. 8, 2019.

*Primary Examiner* — Tammara R Peyton
(74) *Attorney, Agent, or Firm* — Fay Sharpe LLP

(57) ABSTRACT

The present disclosure discloses a parameter configuration method and apparatus, and a display device, belonging to the field of display technologies. The method is applicable to a controller connected to a plurality of drivers, and includes: sending a component information request instruction to a first driver over a first signal line, wherein the first driver is one of the plurality of drivers; receiving a component information response instruction sent over the first signal line by the first driver, wherein the component information response instruction includes component information; determining configuration parameters corresponding to the com- (Continued)

ponent information; and performing parameter configuration for the plurality of drivers by using the determined configuration parameters.

15 Claims, 13 Drawing Sheets

(56) References Cited

FOREIGN PATENT DOCUMENTS

| | | |
|---|---|---|
| CN | 104735641 A | 6/2015 |
| CN | 105260195 A | 1/2016 |
| CN | 106484464 A | 3/2017 |
| CN | 107357595 A | 11/2017 |

* cited by examiner

PARAMETER CONFIGURATION METHOD FOR A DISPLAY DEVICE HAVING A PLURALITY OF DRIVERS FOR EACH CONNECTED COMPONENT

CROSS-REFERENCE TO RELATED APPLICATION

This application claims is a 371 of PCT Application No. PCT/CN2019/072034 filed on Jan. 16, 2019, which claims priority to Chinese Patent Application No. 201810292085.3, filed on Apr. 3, 2018 and entitled "PARAMETER CONFIGURATION METHOD AND DEVICE, AND DISPLAY DEVICE", the entire contents of which are incorporated herein by reference.

TECHNICAL FIELD

The present disclosure relates to the technical field of display, and more particularly, relates to a parameter configuration method, a parameter configuration apparatus, and a display device.

BACKGROUND

A display device may typically include a display panel and a panel drive circuit configured to drive the display panel. The panel drive circuit may include a controller and a driver. As an example, the controller may be a timing controller (T/CON) or a system on chip (SOC), and the driver may be a source drive chip.

SUMMARY

Embodiments of the present disclosure provide a parameter configuration method, a parameter configuration device, and a display device. The technical solutions are as follows:

According to a first aspect of embodiments of the present disclosure, a parameter configuration method is provided. The parameter configuration method is applicable to a controller that is respectively connected to a plurality of drivers, and includes:

sending a component information request instruction to a first driver, wherein the first driver is one of the plurality of drivers;

receiving a component information response instruction sent by the first driver, wherein the component information response instruction includes component information that includes at least one of information of the first driver and information of components connected to the first driver;

determining configuration parameters corresponding to the component information; and performing parameter configuration for the plurality of drivers by using the determined configuration parameters.

Optionally, the controller is respectively connected to the plurality of drivers that are connected in parallel by a first signal line, the first signal line being a signal line for bidirectional signal transmission;

sending the component information request instruction to the first driver includes:

sending the component information request instruction to the first driver over the first signal line; and receiving the component information response instruction sent by the first driver includes:

receiving the component information response instruction sent by the first driver over the first signal line.

Optionally, performing the parameter configuration for the corresponding drivers by using the determined configuration parameters includes:

performing the parameter configuration for the plurality of drivers by using the determined configuration parameters by the first signal line.

Optionally, each instruction transmitted over the first signal line includes a preamble, a start identifier, data bits, and a stop identifier that are arranged in sequence, wherein the preamble is intended to indicate a receiver to perform clock and phase calibration, the start identifier is intended to indicate a start of data transmission, the data bits are intended to carry data, and the stop identifier is intended to indicate a stop of data transmission.

Optionally, determining the configuration parameters corresponding to the component information includes:

querying a corresponding relationship between the component information and the configuration parameters to obtain the configuration parameters corresponding to the component information.

Optionally, the plurality of drivers are arranged in a display device; the information of the first driver includes at least one of manufacturer information of the driver and version number information of the driver; the components connected to the first driver include a display panel; and information of the display panel includes at least one of manufacturer information of the display panel and version number information of the display panel.

Optionally, the controller is a timing controller or a system on chip (SOC), the drivers are source drivers; and the controller is respectively connected to the plurality of drivers by a plurality of second signal lines, and a transmission rate of each of the second signal lines is greater than a transmission rate of the first signal line.

According to a second aspect of embodiments of the present disclosure, a parameter configuration method is provided. The parameter configuration method is applicable to a first driver that is one of a plurality of drivers, the plurality of drivers being respectively connected to a controller. The method includes:

receiving a component information request instruction sent by the controller;

generating a component information response instruction based on the component information request instruction, wherein the component information response instruction includes component information that includes at least one of information of the first driver and information of components connected to the first driver;

sending the component information response instruction to the controller;

accepting parameter configuration performed for the first driver by the controller based on configuration parameters, wherein the configuration parameters correspond to the component information.

Optionally, the plurality of drivers are respectively connected to the controller by first signal line, and the first signal line is a signal line for bidirectional signal transmission;

receiving the component information request instruction sent by the controller includes:

receiving the component information request instruction sent by the controller over the first signal line; and sending the component information response instruction to the controller includes:

sending the component information response instruction to the controller over the first signal line.

Optionally, accepting the parameter configuration performed for the first driver by the controller based on the configuration parameters includes:

accepting the parameter configuration performed for the first driver by the controller based on the configuration parameters over the first signal line.

Optionally, each instruction transmitted over the first signal line includes a preamble, a start identifier, data bits, and a stop identifier that are arranged in sequence, wherein the preamble is intended to indicate a receiver to perform clock and phase calibration, the start identifier is intended to indicate a start of data transmission, the data bits are intended to carry data, and the stop identifier is intended to indicate a stop of data transmission.

Optionally, the plurality of drivers are arranged in a display device; the information of the first driver includes at least one of manufacturer information of the driver and version number information of the driver; the components connected to the first driver include a display panel; and information of the display panel includes at least one of manufacturer information of the display panel and version number information of the display panel.

Optionally, the first driver is further connected to a target printed circuit board (PCB), the information of the display panel is identified by a level of a target pin on the target PCB, the target pin is at least one of pins connected to the first driver, the method further includes:

reading the level of the target pin after the first driver is powered on, to obtain the information of the display panel;

storing the information of the display panel at a target storage address of the first driver, wherein the target storage address is intended to store the component information.

Optionally, the information of the first driver is written at the target storage address before the first driver is assembled into the display device.

Optionally, the controller is a timing controller, and the drivers are source drivers or SOCs; and the controller is respectively connected to the plurality of drivers by a plurality of second signal lines, and a transmission rate of each of the second signal lines is greater than a transmission rate of the first signal line.

According to a third aspect of embodiments of the present disclosure, a parameter configuration apparatus is provided. The parameter configuration apparatus is applicable to a controller that is respectively connected to a plurality of drivers, and includes:

a sending module, operable to send a component information request instruction to a first driver, wherein the first driver is one of the plurality of drivers;

a receiving module, operable to receive a component information response instruction sent by the first driver, wherein the component information response instruction includes component information that includes at least one of information of the first driver and information of components connected to the first driver;

a determining module, operable to determine configuration parameters corresponding to the component information; and a configuring module, operable to perform parameter configuration for the plurality of drivers by using the determined configuration parameters.

Optionally, the controller the controller is respectively connected to the plurality of drivers that are connected in parallel by a first signal line, and the first signal line being a signal line for bidirectional signal transmission;

the sending module is operable to:

send the component information request instruction to the first driver over the first signal line; and the receiving module is operable to:

receive the component information response instruction sent by the first driver over the first signal line.

Optionally, the configuring module is operable to:

perform parameter configuration for the plurality of drivers by using the determined configuration parameters by the first signal line.

Optionally, each instruction transmitted over the first signal line includes a preamble, a start identifier, data bits, and a stop identifier that are arranged in sequence, wherein the preamble is intended to indicate a receiver to perform clock and phase calibration; the start identifier is intended to indicate a start of data transmission; the data bits are intended to carry data; and the stop identifier is intended to indicate a stop of data transmission.

Optionally, the determining module is operable to:

query a corresponding relationship between the component information and the configuration parameters to obtain the configuration parameters corresponding to the component information.

Optionally, the plurality of drivers are arranged in a display device; the information of the first driver includes at least one of manufacturer information of the driver and version number information of the driver; the components connected to the first driver include a display panel; and information of the display panel includes at least one of manufacturer information of the display panel and version number information of the display panel.

Optionally, the controller is a timing controller or a system on chip (SOC), and the drivers are source drivers, and the controller is respectively connected to the plurality of drivers by a plurality of second signal lines, and a transmission rate of each of the second signal lines is greater than a transmission rate of the first signal line.

According to a fourth aspect of embodiments of the present disclosure, a parameter configuration apparatus is provided. The parameter configuration apparatus is applicable to a first driver that is one of a plurality of drivers, wherein the plurality of drivers are respectively connected to a controller. The apparatus includes:

a receiving module, operable to receive a component information request instruction sent by the controller;

a generating module, operable to generate a component information response instruction based on the component information request instruction, wherein the component information response instruction includes component information that includes at least one of information of the first driver and information of components connected to the first driver;

a sending module, operable to send the component information response instruction to the controller;

a configuring module, operable to accept parameter configuration performed for the first driver by the controller based on configuration parameters, wherein the configuration parameters correspond to the component information.

Optionally, the plurality of drivers are respectively connected to the controller by first signal line, and the first signal line is a signal line for bidirectional signal transmission;

the receiving module is operable to:

receive the component information request instruction sent by the controller over the first signal line; and the sending module is operable to:

send the component information response instruction to the controller over the first signal line.

Optionally, the configuring module is operable to:

accept the parameter configuration performed for the first driver by the controller based on the configuration parameters over the first signal line.

Optionally, each instruction transmitted over the first signal line includes a preamble, a start identifier, data bits, and a stop identifier that are arranged in sequence;

wherein the preamble is intended to indicate a receiver to perform clock and phase calibration, the start identifier is intended to indicate a start of data transmission, the data bits are intended to carry data, and the stop identifier is intended to indicate a stop of data transmission.

Optionally, the plurality of drivers are arranged in a display device; the information of the first driver includes at least one of manufacturer information of the driver and version number information of the driver; the components connected to the first driver include a display panel; and information of the display panel includes at least one of manufacturer information of the display panel and version number information of the display panel.

Optionally, the first driver is further connected to a target printed circuit board (PCB), information of the display panel is identified by a level of a target pin on the target PCB, the target pin is at least one of pins connected to the first driver, and the apparatus further includes:

a reading module, operable to read the level of the target pin after the first driver is powered on, to obtain the information of the display panel; and a storing module, operable to store the information of the display panel at a target storage address of the first driver, wherein the target storage address is intended to store the component information.

Optionally, the information of the first driver is written at the target storage address before the first driver is assembled into the display device.

Optionally, the controller is a timing controller, and the drivers are source drivers or SOCs; and the controller is respectively connected to the plurality of drivers by a plurality of second signal lines, and a transmission rate of each of the second signal lines is greater than a transmission rate of the first signal line.

According to a fifth aspect of embodiments of the present disclosure, a parameter configuration device is provided. The parameter configuration device is applicable to a controller connected to a plurality of drivers, and includes:

a processor;

a memory, operable to store at least one executable instruction of the processor, wherein the processor is operable to perform the parameter configuration method as defined in any one of the first aspect when the at least one executable instruction is executed by the processor.

According to a sixth aspect of embodiments of the present disclosure, a parameter configuration device is provided. The parameter configuration device is applicable to a first driver that is one of a plurality of drivers, wherein the plurality of drivers are connected to a controller. The device includes:

a processor;

a memory, operable to store at least one executable instruction of the processor, wherein the processor is operable to perform the parameter configuration method as defined in any one of the second aspect when the at least one executable instruction is executed by the processor.

According to a seventh aspect of embodiments of the present disclosure, a display device is provided. The display device includes a display panel, a controller, and a plurality of drivers, wherein the plurality of drivers are connected to the controller, the controller includes the parameter configuration apparatus as defined in any one of the third aspect, and the plurality of drivers include the parameter configuration apparatus as defined in any one of the fourth aspect.

According to an eighth aspect of embodiments of the present disclosure, a display device is provided. The display device includes a display panel, a controller, and a plurality of drivers, wherein the plurality of drivers are connected to the controller, the controller includes the parameter configuration device as defined in the fifth aspect, and the plurality of drivers include the parameter configuration device as defined in the sixth aspect.

According to a ninth aspect of embodiments of the present disclosure, a computer-readable storage medium storing at least one instruction therein is provided. When running on a processing component, the computer-readable storage medium causes the processing component to perform the parameter configuration method as defined in any one of the first aspect, or causes the processing component to perform the parameter configuration method as defined in any one of the second aspect.

According to a tenth aspect of embodiments of the present disclosure, a computer program product storing at least one instruction is provided. When running on a computer, the computer program product causes the computer to perform the parameter configuration method as defined in any one of the first aspect above; or causes the computer to perform the parameter configuration method as defined in any one of the second aspect.

According to an eleventh aspect of embodiments of the present disclosure, a chip is provided. The chip includes a programmable logic circuit and/or at least one program instruction. When running, the chip is operable to perform the parameter configuration method as defined in any one of the first aspect above, or to perform the parameter configuration method as defined in any one of the second aspect above.

It should be understood that both the foregoing general description and the following detailed description are exemplary only and are not intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

The accompanying drawings, which are incorporated in and constitute a part of this specification, illustrate embodiments consistent with the present disclosure, and together with the description, serve to explain the principles of the present disclosure.

DETAILED DESCRIPTION

For clearer descriptions of the technical solutions and principles in the present disclosure, the present disclosure is described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
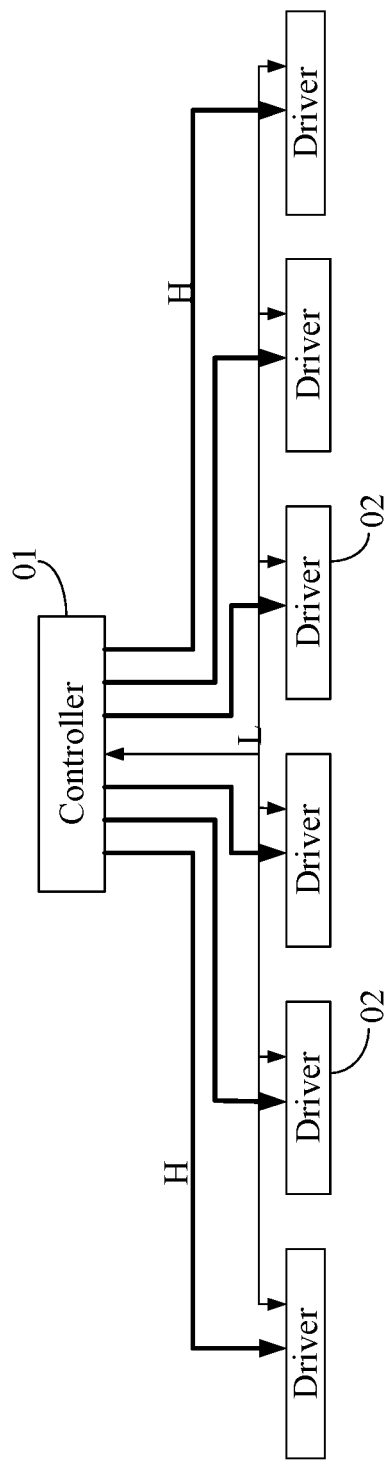
FIG. 1 is a schematic diagram of an application environment of a parameter configuration method according to an embodiment of the present disclosure.
Figure 2:
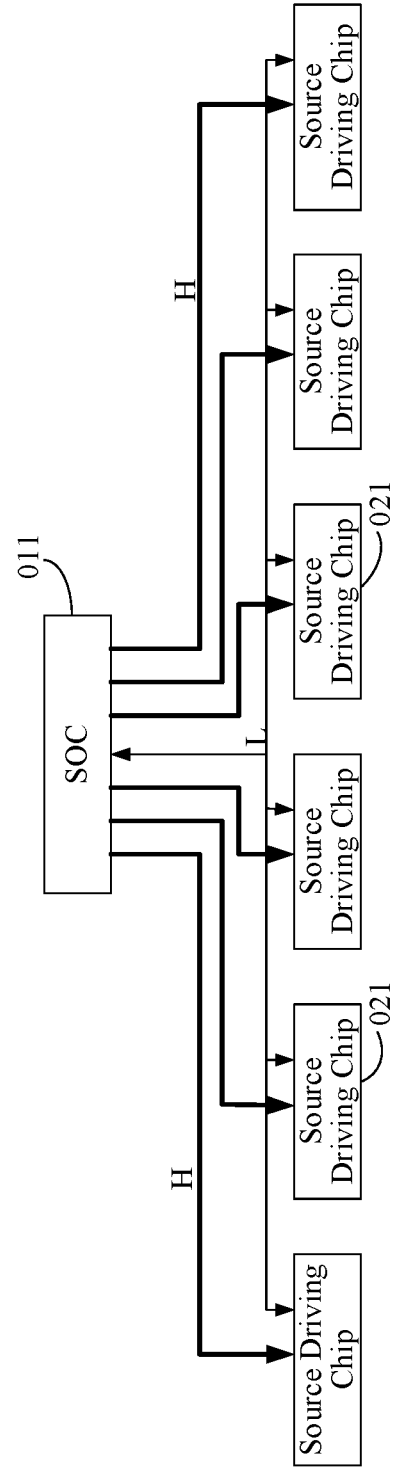
FIG. 2 is a schematic diagram of an application environment of another parameter configuration method according to an embodiment of the present disclosure.

Referring to FIG. 1, a schematic diagram of an application environment of a parameter configuration method according to an embodiment of the present disclosure is shown. As shown in FIG. 1, the parameter configuration method is applicable to a display device, and involves a controller 01 and a plurality of drivers 02. The controller 01 is connected to the plurality of drivers 02 by a plurality of second signal lines H in one-to-one corresponding relationship, and is also connected to a first signal line L (one first signal line is usually arranged). The plurality of drivers 02 are connected in parallel and connected to the first signal line L. The first signal line may be a low-speed signal line, and the second signal lines may be high-speed signal lines. That is, a signal transmission rate of the first signal line is less than a signal transmission rate of each of the second signal lines. For example, the first signal line is an ordinary signal line, and the second signal lines are differential signal lines. In practice, the controller 01 may be a timing controller or an SOC, and the drivers 02 may be source drive chips. As shown in FIG. 2, a schematic diagram of an application environment of another parameter configuration method is shown. It is assumed that the controller is SOC 011, the drivers are source driver chips 021, and reference may be made to FIG. 1 for other reference numerals.

In a panel drive circuit of a conventional display device, the above first signal line L may only be intended to identify a level state. For example, a pin of the source drive chip is set to a high level or a low level over the first signal line L.

However, in this embodiment of the present disclosure, in addition to identifying the level state, the first signal line L may also transmit other instructions to implement different data transmission functions, with each data transmission function corresponding to at least one transmission mode. The first signal line L may transmit signals in bidirectional (i.e., both from the controller to the drivers and from the drivers to the controller), and is also referred to as a bidirectional signal transmission channel. For example, the controller may implement the function of sending broadcast configuration instructions to the drivers over the first signal line, and this function corresponds to a broadcast mode. That is, in the broadcast mode, the controller is indicated to perform data broadcast. The controller may also send identity configuration instructions to the drivers over the first signal line to implement the function of sending identity identifications to the drivers, and this function corresponds to an identity identification (ID) assignment mode. That is, in the identity identification assignment mode, the controller is indicated to assign identity identifications for the drivers. The controller may also send point-to-point (also referred to as end-to-end) configuration instructions to the drivers over the first signal line to implement the function of point-to-point control on the drivers, and this function corresponds to a downstream communication (DC) mode. That is, in the downstream communication mode, the controller is indicated to perform point-to-point data transmission on the drivers. The drivers may implement the function of sending control response instructions for the point-to-point configuration instructions to the controller through the first signal line, or sending identity configuration response instructions for the identity configuration instructions to the controller over the first signal line, and this function corresponds to a reply transaction (RT) mode. That is, in the reply transaction mode, the drivers are indicated to reply to the instructions from the controller. Through the coordination of the above modes, the controller may sequentially complete operations of assigning the identity identifications for the drivers, reading/writing data, receiving data feedback of the drivers and the like.

Optionally, in this embodiment of the present disclosure, the formats of the instructions transmitted between the controller and the drivers are the same, and each instruction transmitted over the first signal line includes a preamble, a start identifier, data bits (also referred to as a transaction body), and a stop identifier.

The preamble is intended to indicate a receiver to perform clock and phase calibration. When detecting the preamble transmission on the first signal line, the receiver (the controller or the drivers) performs the clock and phase adjustment according to the content of the preamble. The clock and phase adjustment refers to keeping the clock consistent with a clock of a transmitter, and keeping the phase the same as a phase of the transmitter. The receiver adjusts the clock and phase during receiving of the preamble, and completes the clock and phase adjustment after the transmission of the preamble ends. The start identifier is intended to indicate a start of data transmission, the data bits are intended to carry data, and the stop identifier is intended to indicate a stop of data transmission.

Figure 3:
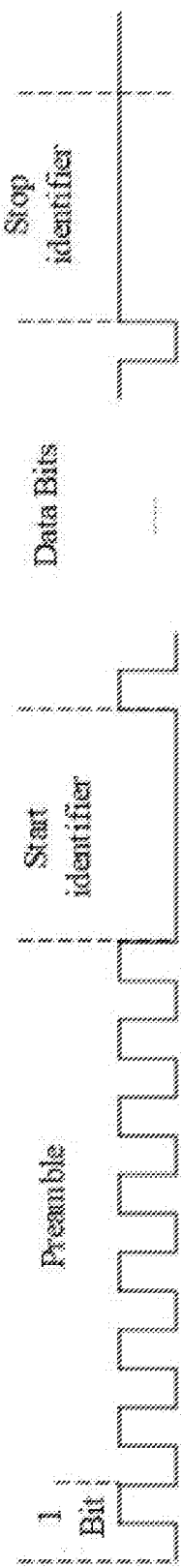
FIG. 3 is a schematic diagram of an instruction format according to an exemplary embodiment of the present disclosure.

As an example, the preamble may be obtained by at least eight bits of consecutive binary 0s using Manchester encoding. As shown in FIG. 3, the preamble obtained by eight bits of consecutive binary 0s using the Manchester encoding is schematically illustrated in FIG. 3. The start identifier may maintain a low-level signal without using the Manchester encoding, and for example, include at least two bits of consecutive binary 0s. In FIG. 3, two bits of consecutive binary 0s as the start identifier are schematically illustrated. The data carried by the data bits is data obtained by using the Manchester encoding. The stop identifier may maintain a high-level signal without using the Manchester encoding, and include at least two bits of consecutive binary 1s. In FIG. 3, two bits of consecutive binary is as the stop identifier are schematically illustrated.

It should be noted that using the Manchester encoding may result in an obvious transition edge in the data to facilitate data detection, therefore, any data that needs to be encoded may be encoded by using the Manchester encoding in this embodiment of the present disclosure. However, in practice, other encoding schemes or no encoding may be used. Further, in order to ensure that the data carried by the data bits may be effectively identified at a decoder, referring to FIG. 3, a first bit of the data in the data bits may generate a transition edge along with the start identifier (that is, the first bit of the data in the data bits is different from a value of a last bit of the start identifier. For example, the first bit of the data in the data bit is 1, and the last bit of the start identifier is 0). The last bit of the data in the data bits may generate a transition edge formed with the stop identifier (that is, the last bit of the data in the data bit is different from the value of the first bit of the stop identifier. For example, the last bit of the data in the data bit is 0, and the last bit of the stop identifier is 1). The above transition edge facilitates effective identification of data at the receiver.

In the different instructions described above, the data carried by the data bits includes: a mode identification for indicating a transmission mode of the first signal line. The transmission mode may be the broadcast mode, the identity identification assignment mode, the downstream communication mode, or the reply transmission mode as described above. The mode identification for indicating the transmission mode of the first signal line may occupy two bits of the data bits. By detecting the mode identification, a current data transmission mode may be determined.

For example, the instructions transmitted over the first signal line may include: the broadcast configuration instruction, the point-to-point transmission instruction, the identity configuration instruction, the identity configuration response instruction or the configuration response instruction. The broadcast configuration instruction, the point-to-point transmission instruction and the identity configuration instruction are sent to the drivers by the controller; the transmission mode of the broadcast configuration instruction is the broadcast mode; the transmission mode of the point-to-point transmission instruction is the downstream communication mode; and the transmission mode of the identity configuration instruction is the identity identification assignment mode. The identity configuration response instruction and the configuration response instruction are sent to the controller by the drivers; the identity configuration response instruction is a response instruction for an identity configuration parameter; the configuration response instruction is a response instruction for the point-to-point transmission instruction; and the transmission mode of both the identity configuration response instruction and the configuration response instruction is the reply transmission mode.

Currently, most display devices are assembled products. In an assembling process of the display device, it is necessary to manually configure parameters for at least one of the controller and the drivers according to the information of the drivers and the information of the display panel, so as to ensure that the controller and the drivers are matched in parameter after being assembled. This results in a lower efficiency in parameter configuration.

Figure 4:
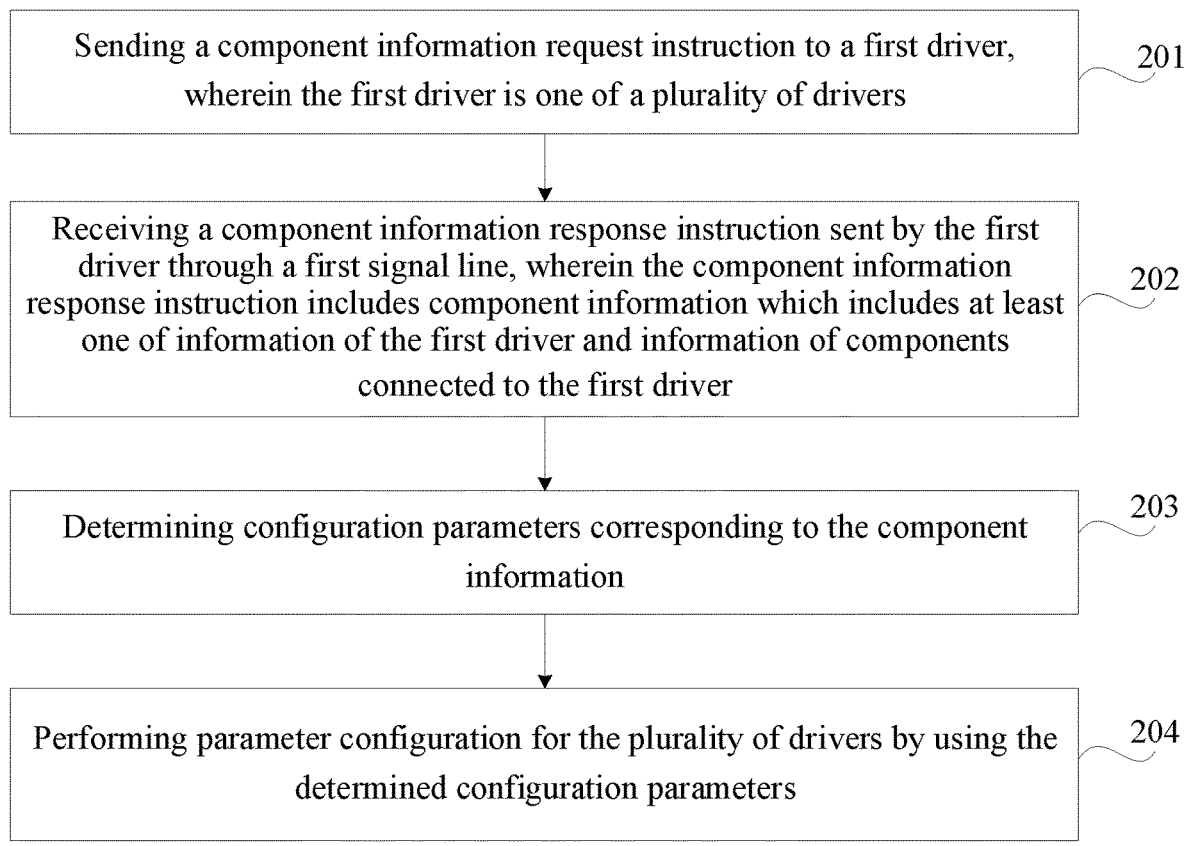
FIG. 4 is a flowchart showing a parameter configuration method according to an exemplary embodiment.

An embodiment of the present disclosure provides a parameter configuration method, which can solve the problem of low efficiency in parameter configuration. As shown in FIG. 4, the method is applicable to a controller. The controller may be a controller in an application environment shown in FIG. 1 or FIG. 2. The controller is connected to a plurality of drivers by a first signal line, and the plurality of drivers may be connected in parallel and in the same type. For example, the drivers are all source drive chips. The method is performed after the assembly of display device, and includes the following steps.

In step 201, a component information request instruction is sent to a first driver. The first driver is one of the plurality of drivers.

For example, the component information request instruction is sent to the first driver over the first signal line.

Optionally, the component information request instruction may be a broadcast configuration instruction corresponding to a broadcast mode; or a point-to-point configuration instruction corresponding to a DC mode.

In step 202, a component information response instruction sent by the first driver is received. The component information response instruction includes component information. The component information includes at least one of information of the first driver and information of components connected to the first driver. The component information may be acquired by the first driver.

For example, the component information response instruction sent by the first driver over the first signal line is received. The component information response instruction may be a control response instruction for the point-to-point configuration instruction, and corresponds to an RT mode.

In step 203, configuration parameters corresponding to the component information are determined.

In step 204, parameter configuration is performed for the plurality of drivers by using the determined configuration parameters.

In summary, in the parameter configuration method according to this embodiment of the present disclosure, the controller acquires the component information from the first driver, acquires corresponding configuration parameters based on the component information, and performs parameter configuration for the plurality of drivers by using the configuration parameters. As a result, the parameter configuration may be implemented automatically without human intervention required, and the efficiency in parameter configuration is thus improved.

Figure 5:
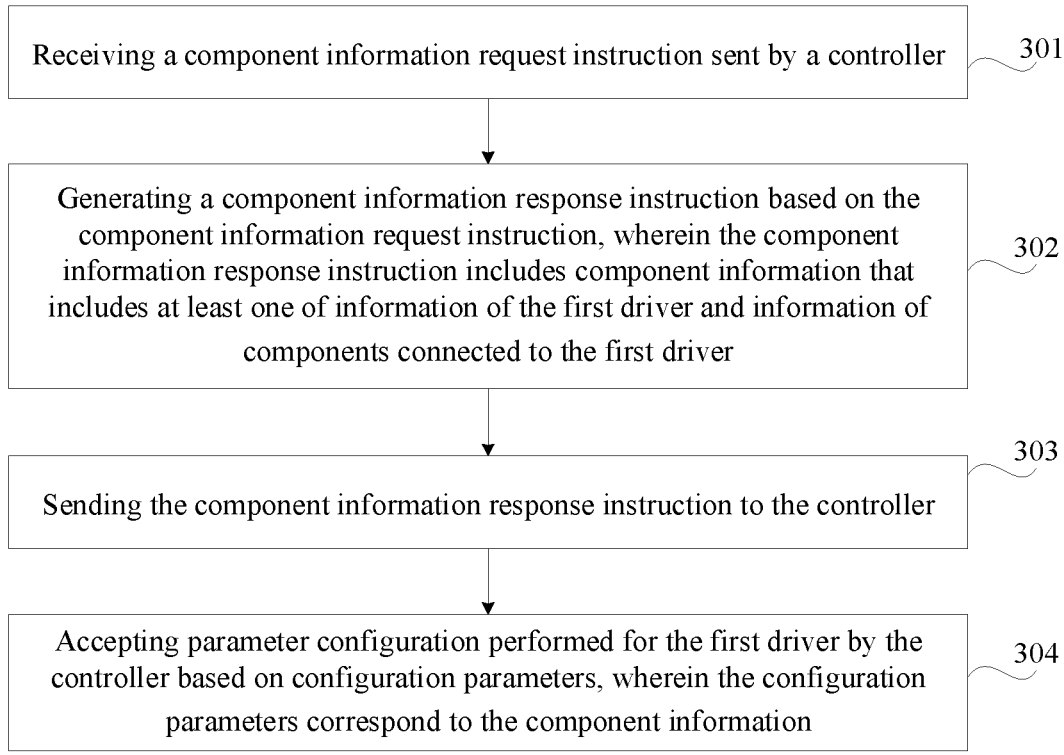
FIG. 5 is a flowchart showing another parameter configuration method according to an exemplary embodiment.

An embodiment of the present disclosure provides a parameter configuration method that is applicable to a first driver. The first driver is one of a plurality of drivers that are connected to a controller by a first signal line. The first driver may be one of the plurality of drivers in the application environment shown in FIG. 1 and FIG. 2. The plurality of drivers may be connected in parallel and in the same type. For example, all the drivers are source drive chips. The method is performed after assembly of a display device. As shown in FIG. 5, the method includes the following steps.

In step 301, a component information request instruction sent by a controller is received.

For example, the component information request instruction sent by the controller is received over the first signal line.

Optionally, the component information request instruction may be a broadcast configuration instruction corresponding to a broadcast mode; or a point-to-point configuration instruction corresponding to a DC mode.

In step 302, a component information response instruction is generated based on the component information request instruction. The component information response instruction includes component information that includes at least one of information of the first driver and information of components connected to the first driver. The component information may be acquired by the first driver.

The component information response instruction may be a control response instruction for the point-to-point configuration instruction, and corresponds to an RT mode.

In step 303, the component information response instruction is sent to the controller.

For example, the component information response instruction is sent to the controller over the first signal line.

In step 304, the parameter configuration performed for the first driver by the controller based on configuration parameters is accepted. The configuration parameters correspond to the component information.

In summary, in the parameter configuration method according to this embodiment of the present disclosure, the controller acquires the component information from the first driver, acquires corresponding configuration parameters based on the component information, and performs parameter configuration for the plurality of drivers by using the configuration parameters. As a result, the parameter configuration may be implemented automatically without human intervention required, and the efficiency in parameter configuration is thus improved.

An embodiment of the present disclosure provides a parameter configuration method. As an example, the method may be applicable to the application environment shown in FIG. 1 or FIG. 2, for implementing the control on the drivers by the controller after assembly of the display device. The controller is connected to a plurality of drivers through the first signal line, and both the controller and the plurality of drivers are arranged in the display device. In the present disclosure, the component information includes at least one of information of the drivers and information of components connected to the drivers, and the connected components are usually a display panel. In an optional example, the connected components may also be other components that require parameter configuration, such as a touch panel, a sensor and the like.

Referring to FIG. 1 and FIG. 2, in the display device, all drivers of the same type are typically connected in parallel on the same first signal line, designs and connections of all drivers of the same type are typically the same. That is, all the drivers are from the same manufacturer and connected to the same type of display panels (typically the same display panel). Therefore, the information of the drivers of the same type is the same, and the obtainable information of the display panel is also the same. As such, each of the drivers may obtain the same component information. Consequently, the component information may be acquired as long as the controller reads component information of any one of the same type of drivers or a specified driver.

To effectively identify the drivers, the information of each of the drivers is written at the target storage address before the driver is assembled into the display device. For example, the information of each of the drivers has been configured before the driver leaving the factory, and is typically written at a target storage address of the driver through specific writing equipment; and for another example, before the display device is assembled by an operator, the information of the driver is written at the target storage address of the driver through specific writing equipment. When needing to acquire the information of the driver, the driver only needs to read data at the target storage address. The connection between the driver and the display panel is established during subsequent assembly. That is, the driver may determine the display panel to which it is connected only after the driver and the display panel are assembled, and then acquire the information of the display panel. After the display device is assembled, the controller is typically arranged on a board, and each of the drivers is connected to a printed circuit board (PCB). The board is also referred to as PCB. In this embodiment of the present disclosure, since the operator already knows the information of the display panel during the assembly of the display device, the levels of the pins connected to the drivers on the PCB may be set high (i.e., setting to a high level) or low (i.e., setting to a low level) to identify the information of the display panel for the drivers to read. It should be noted that the display panel connected to the drivers may be an organic light-emitting diode (OLED) display panel or a liquid crystal display (LCD) panel.

As an example, when the controller is a timing controller or an SOC and the drivers are source drive chips, the controller is typically welded to the board for small-sized display devices, such as mobile phones or notebook computers. The drivers are arranged on the display panel, and the board where the controller is located is connected to the drivers through a flexible printed circuit (FPC) board. Such a driver structure is referred as a chip on glass package structure. Herein, the PCB connected by the drivers is the board where the controller is located (the PCB connected by the drivers may be the board where the controller is located, or the PCB connected by the board where the controller is located and which has a function of signal transmission). The pins of the PCB may be set by the operator to identify the information of the display panel. The PCB connected by the drivers may be referred as a target PCB in the present disclosure.

As an example, when the controller is a timing controller or an SOC, and the drivers are source drive chips, the controller is typically welded to a board and the drivers are arranged on a flexible substrate (also referred as a crystalline soft film of the flexible circuit board), for large-sized display devices, such as televisions or electronic screens. The controller and the drivers are connected through another PCB on which signal lines between the controller and the drivers are arranged, and the signal lines provide a long-sized routing. Such a driver structure is referred as a chip on flex or chip on film (COF) structure. Herein, the PCB connected by the driver is another PCB providing the routing. The pins of this PCB may be set by the operator to identify the information of the display panel. Said another PCB may be referred to as a target PCB in the present disclosure.

In an actual implementation of the embodiment of the present disclosure, the controller needs to reserve pins when leaving a factory, so as to identify the information of the display panel during assembly. The reserved pins may be original idle pins of the controller, or dedicated functional pins provided for the controller. Accordingly, corresponding terminals need to be reserved for the drivers to connect the reserved pins. These terminals may be the original idle terminals of the drivers, or dedicated function terminals provided for the drivers.

As previously discussed, each of the drivers may acquire the same component information. In order to reduce a level configuration process by the operator and reduce the number of the drivers reading the component information for a decrease in computation cost, the operator may determine one driver for reading the information of the display panel, and set the level of the pin of the PCB to which the determined driver is connected. Eventually, the information of the display panel is acquired by the determined driver. Assuming that the determined driver is a first driver, pins for identifying the information of the display panel, among the pins on the target PCB connected to the first driver, may be referred to as target pins, which include at least one pin. Since the information of the display panel is identified by a high level "1" and a low level "0" of the target pins, the target pins typically include at least two pins on the PCB for effective identification.

Figure 6:
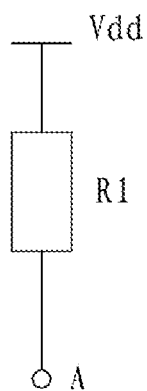
FIG. 6 is a schematically partial structural diagram of a target PCB with one of target pins set to a high level.
Figure 7:
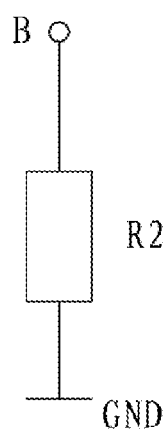
FIG. 7 is a schematically partial structural diagram of a target PCB with one of target pins set to a low level.

Referring to FIG. 6 and FIG. 7, FIG. 6 is a schematically partial structural diagram of a target PCB with one of target pins set to a high level; and FIG. 7 is a schematically partial structural diagram of a target PCB with one of target pins set to a low level. The implementation of setting the pins of the PCB connected to the drivers to a high level or a low level as described above may be achieved by adjusting the position of resistance (also referred to as external resistance) of the pins of the PCB. In FIG. 6, a pin A is connected to a high level Vdd by a resistor R1, that is, the resistor R1 is located between the high level Vdd and the pin A, and the pin A has a high level. Accordingly, a level read by the first driver connected to the pin A is "1". In FIG. 7, the pin B is connected to ground GND through a resistor R2, that is, the resistor R2 is arranged between the ground GND and the pin B, and the Pin B has a low level. Accordingly, a level read by the first driver connected to the pin B is "0".

Figure 8:
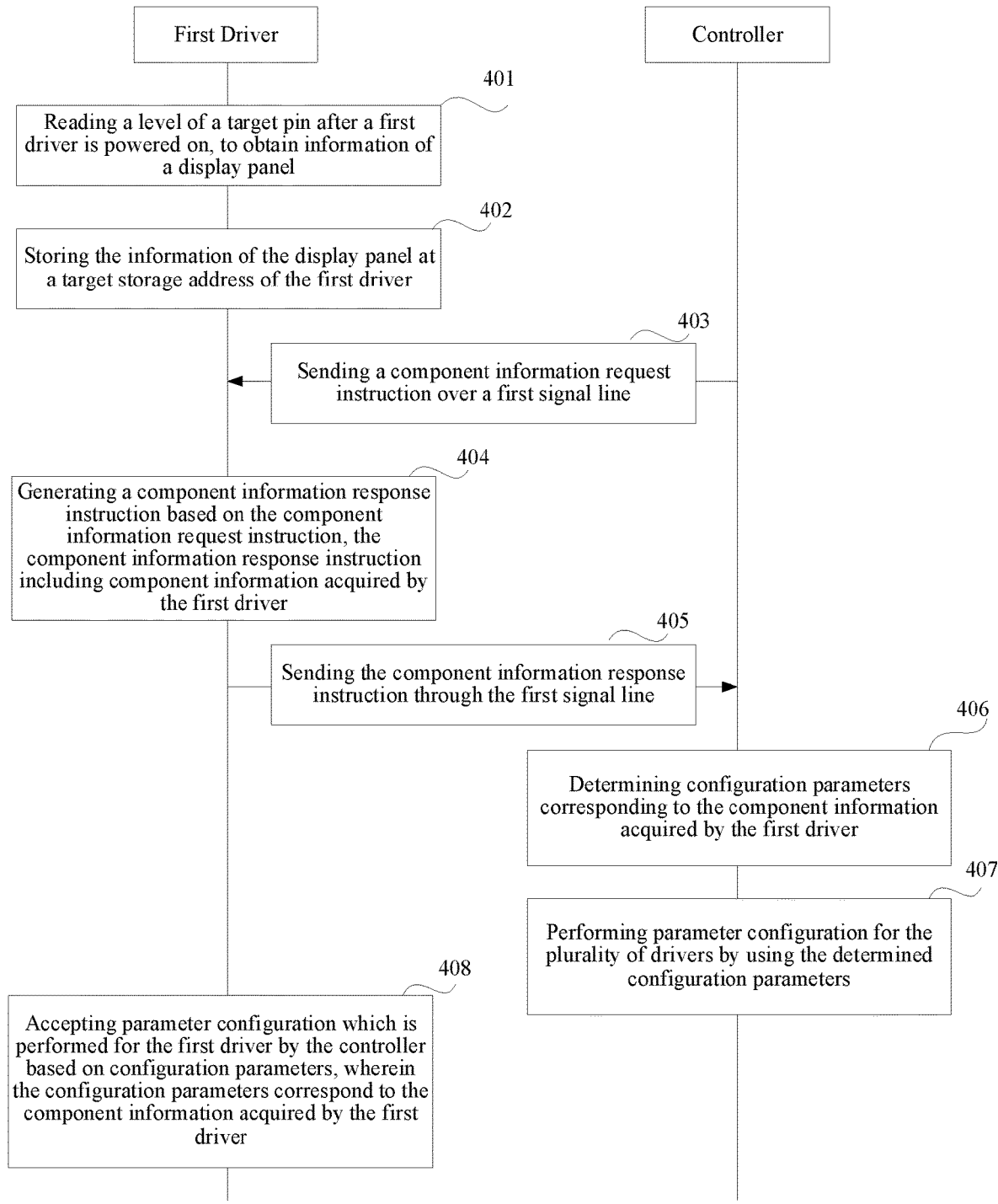
FIG. 8 is a flowchart showing a yet another parameter configuration method according to an exemplary embodiment.

The embodiment of the present disclosure takes the first driver as an example to describe the parameter configuration method, and the first driver is one of the plurality of drivers. The first driver may be any one of the plurality of drivers, or a specified one of the plurality of drivers, for example, the first one or the last one of the plurality of drivers. For the first driver, the component information acquired thereby includes at least one of the information of the first driver and the information of components connected to the first driver. In this embodiment of the present disclosure, the acquired component information including the information of the first driver and the information of the display panel (that is, the components connected to the first driver include the display panel) is illustrated as an example. As shown in FIG. 8, the method includes the following steps.

In step 401, a level of a target pin is read by a first driver after the first driver is powered on, to obtain information of a display panel.

After the system of the display device is powered on, the first driver is accordingly powered on, and a logic circuit inside the first driver starts to work. Here, the first driver may read the information of the display panel identified by the level of the target pins of the target PCB, which is connected to the first driver and is set with the information of the display panel. An arrangement order of the target pins may be a preset order (which may be set before the first driver leaves the factory or before assembly). When reading the level, the first driver performs a reading action according to the preset order. It should be noted that a reading process is typically performed after the first driver is powered on and initialized for the first time, and this reading process may not be performed during the subsequent repeated power-on, so as to reduce the cost of information reading.

It should be noted that, after the system of the display device is powered on, the controller may configure an ID that is identifiable to the controller for each drive chip, so as to facilitate the control over each of the drivers. Optionally, the controller may configure an ID for each drive chip based on the first signal line. In the subsequent point-to-point configuration instruction, the ID may be carried in the instruction to identify a sending target of the instruction. For example, the ID of the first driver may be "00001".

In step 402, the first driver stores the information of the display panel at a target storage address of the first driver.

The target storage address above is intended to store the component information. After reading the information of the display panel, the first driver may store the information of the display panel at the target storage address. As an example, the target storage address may be a storage address of a specified register in the first driver. The target storage address is an address predetermined with the SOC. In this way, the SOC may be ensured to carry the address when sending the component information request instruction, so that the first driver may read the component information at the address. For example, the storage address is: "0000000010".

As previously discussed, the information of the driver written before the first driver is assembled may also be stored at the target storage address.

Optionally, the information of the display panel may include at least one of manufacturer information of the display panel and version number information of the display panel; and the information of the driver may include at least one of manufacturer information of the driver and version number information of the driver. As previously discussed, the manufacturer information of the driver and the version number information of the driver may be designed before the driver leaves the factory, and written into the driver in codes. The manufacturer information of the display panel and the version number information of the display panel may be set on the target PCB by an operator during the assembly of the display device, and then read by the first driver.

The manufacturer information of the driver may include an identification (ID) of the driver manufacturer; and the ID may be composed of characters such as numbers, letters, space marks and/or texts, for example, "010". The version number information of the driver may be a version number or an indicator of the version number, and may be composed of characters such as numbers, letters, spacer marks, and/or texts, such as "010". The manufacturer information of the display panel may include an ID of the display panel manufacturer, and the ID may be composed of characters such as numbers, letters, space marks, and/or texts, such as "10". The version number information of the display panel may be a version number or a version number indicator, and may be composed of characters such as numbers, letters, space marks, and/or texts, such as "100". It should be noted that the above component information may be represented in the form of binary numbers, so as to facilitate the reading and writing of data.

There may be many combinations of various pieces of information in the component information above. In order to achieve effective transmission of the component information, the controller and the first driver may predetermine a combination of various pieces of information. When transmitting the component information, the first driver sends the component information to the controller according to the predetermined combination. After receiving the component information, the controller reads various pieces of information in the component information according to the predetermined combination. As an example, it is assumed that the predetermined combination is as follows: the component information includes the version number information of the display panel, the version number information of the driver and the manufacturer ID of the display panel that are arranged in sequence. Moreover, it is assumed that the version number information of the display panel is "100", the version number information of the driver is "010", and the manufacturer ID of the display panel is "10". Then, the component information to be transmitted is "10001010".

As an example, assuming that the first driver is a source drive chip, the component information of the first driver may be as shown in Table 1. It may be seen from Table 1 that the manufacturer information of the source drive chip is chip manufacturer 1, which indicates that the source drive chip is manufactured by the chip manufacturer 1. The manufacturer information of the display panel is display panel manufacturer 1, which indicates that a display panel connected to the source drive chip is manufactured by the display panel manufacturer 1. The version number information of the source drive chip is version 1.1, which indicates that the version of the source drive chip is 1.1. Therefore, the first driver is the source drive chip of version 1.1, manufactured by the chip manufacturer 1.

TABLE 1

| Manufacturer Information of Source Drive Chip | Manufacturer Information of Display Panel | Version Number Information of Source Drive Chip |
|---|---|---|
| Chip manufacturer 1 | Display panel manufacturer 1 | Version 1.1 |

In step 403, the controller sends the component information request instruction to the first driver over the first signal line.

The controller may send the component information request instruction to the first driver over the first signal line after the system of the display device is powered on. In order to ensure that the display device displays image effectively, the component information request instruction is typically sent to the first driver after the display device is powered on and initialized for the first time.

In step 404, the first driver generates a component information response instruction based on the component information request instruction. The component information response instruction includes component information acquired by the first driver.

In step 402, upon receiving the component information request instruction sent by the controller over the first signal line, the first driver may acquire the component information at the target storage address based on the component information request instruction (the component information is stored at the target storage address of the first driver), and then generate the component information response instruction based on the component information.

It should be noted that the component information request instruction may carry the target storage address above, for example, the storage address of the specified register above. The first driver may read the corresponding component information based on the target storage address. For example, the target storage address is "0000000010".

Alternatively, the component information request instruction may not carry the target storage address. The component information request instruction may include a reading indication identification, which is intended to identify that the component information request instruction is an instruction for reading the component information. The first driver may directly query the predetermined target storage address based on the instruction to read the corresponding component information.

In step 405, the first driver sends the component information response instruction to the controller over the first signal line.

In step 406, the controller determines configuration parameters corresponding to the component information acquired by the first driver.

After receiving the component information response instruction sent over the first signal line by the first driver, the controller determines the configuration parameters corresponding to the component information acquired by the first driver. Optionally, the controller may query a corresponding relationship between the component information and the configuration parameters to obtain the configuration parameters corresponding to the component information. The corresponding relationship is stored in a memory corresponding to the controller. For example, the memory corresponding to the controller is a memory in the controller or an externally connected memory.

For example, when the controller is an SOC, the corresponding relationship between the component information and the configuration parameters may be stored in a specified memory of the SOC, such as a Flash chip. The controller may query the corresponding relationship in the specified memory, and load the configuration parameters corresponding to the component information obtained through the query, into the SOC.

The corresponding relationship between the component information and the configuration parameters may be as shown in Table 2. Table 2 may record a variety of component information and corresponding configuration parameters. As an example, when the component information acquired by the first driver is shown in Table 1, it may be known by querying Table 2 that the corresponding configuration parameter is information 1.

TABLE 2

| Component Information | | | |
|---|---|---|---|
| Manufacturer Information of Source Drive Chip | Manufacturer Information of Display Panel | Version Number Information of Source Drive Chip | Configuration Parameter |
| Chip manufacturer 1 | Display panel manufacturer 1 | Version 1.1 | Information 1 |
| Chip manufacturer 1 | Display panel Manufacturer 2 | Version 1.1 | Information 2 |
| ... | ... | ... | ... |
| Chip manufacturer 2 | Display panel manufacturer 3 | Version 1.2 | Information n |

Figure 9:
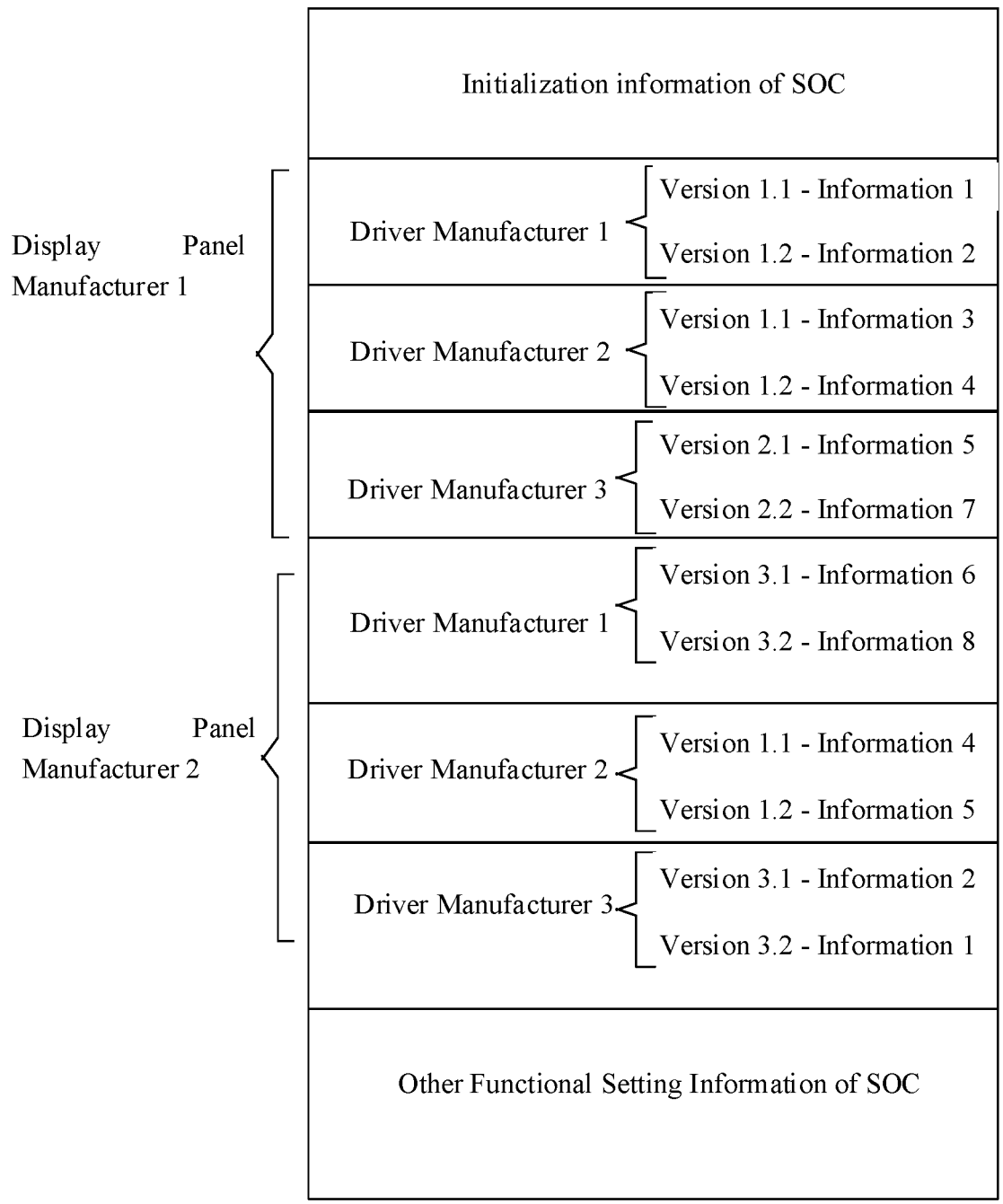
FIG. 9 is a schematic diagram showing information stored in a specified memory corresponding to an SOC according to an exemplary embodiment.

It should be noted that the memory corresponding to the controller may also store other information to ensure the implementation of other functions of the controller. For example, when the controller is a SOC, the SOC may also store other desired information, and the information and the corresponding relationship above may be stored at different address segments of the memory corresponding to the SOC. Moreover, there is a certain order of storage locations, for example, an order in a time sequence, or an order in a priority sequence. For example, as shown in FIG. 9, other information may be initialization information of the SOC and other functional setting information of the SOC. The initialization information of the SOC is information required to be configured during the initialization of the SOC; and the other functional setting information of the SOC is information required to be configured for implementing other functions of the SOC. The above corresponding relationships may be stored at different address segments in a block form, and associated through an index table or a mapping table. For example, in FIG. 9, it is assumed that the component information includes: the manufacturer information of the display panel, the manufacturer information of the driver and the version number information of the driver. The corresponding relationships are grouped into multiple sets of first corresponding relationships according to the manufacturer information of the display panel; and the first corresponding relationships are corresponding relationships between the manufacturer information of the display panel and the manufacturer information of the driver. One set of first corresponding relationships corresponding to the manufacturer information of the same display panel are further grouped into multiple sets of second corresponding relationship according to the manufacturer information of the driver; and the second corresponding relationships are corresponding relationships between the manufacturer information of the driver and the version number information of the driver. One set of second corresponding relationships corresponding to the manufacturer information of the same driver are further grouped into multiple sets of third corresponding relationships according to the version number information of the driver. In the third corresponding relationship, the version number information of each of the drivers corresponds to a set of configuration parameters. That is, the third corresponding relationships are corresponding relationships between the version number information of the driver and the configuration parameters. In FIG. 9, it is assumed that the manufacturer information of the display panel includes Display Panel Manufacturer 1 and Display Panel Manufacturer 2; the manufacturer information of the driver includes Driver Manufacturers 1 to 3; the version number information of the driver includes Version Number 1.1 to Version Number 3.2; and the configuration parameters include Information 1 to 8. FIG. 9 only schematically depicts part of the above corresponding relationships, and is not intended to limit the storage forms of these corresponding relationships.

In step 407, the controller performs parameter configuration for the plurality of drivers by using the determined configuration parameters.

As previously discussed, the component information of the plurality of drivers is the same, and accordingly, the configuration parameters are also the same. Therefore, upon determining the configuration parameters, the controller performs parameter configuration for the plurality of drivers based on the determined configuration parameters. The plurality of drivers includes the first driver above.

Optionally, the controller may perform parameter configuration for the plurality of drivers by using the determined configuration parameters by the first signal line. In this way, the controller may implement the parameter configuration for each of the drivers without the involvement of the second signal line. The function of the first signal line is enriched, and the efficiency in parameter configuration is improved.

As an example, the configuration parameters may include at least one of number information of the second signal lines (also referred to as a number of high-speed channels), transmission rate information (i.e., a data transmission rate over each signal line, with each signal line including the foregoing first signal line and/or a second signal line) and signal equalizer (EQ) information. Assuming that the first driver is a first source drive chip, the configuration parameters may further include: an identification of the first driver, an address of a register to be configured on the first driver, an operation type, and data corresponding to an operation indicated by the operation type and the like. The operation type above may be a read type or a write type. When the operation type is the read type, the operation indicated by the operation type is a read operation, with corresponding data being a read operation address. When the operation type is a write type, the operation indicated by the operation type is a write operation, with corresponding data being a write operation address and data required to be written.

Further, the configuration process may be implemented by a broadcast configuration instruction, or by a point-to-point configuration instruction. For example, the configuration parameter may be carried in data in the data bits of the broadcast configuration instruction above.

In step 408, the first driver accepts the parameter configuration performed for the first driver by the controller based on the configuration parameters.

Corresponding to step 407, the first driver may accept the parameter configuration performed for the first driver by the controller over the first signal line based on the configuration parameters. In this way, the first driver may implement the parameter configuration without the involvement of the second signal line. The function of the first signal line is enriched, and the efficiency in parameter configuration is improved.

As described in step 406, the configuration parameters corresponding to the component information acquired by the first driver is determined by the controller, and is typically determined by looking up in the table. These configuration parameters are initialization parameters of the drivers.

It should be noted that, upon completion of step 408, the controller completes the adaptive parameter configuration for the drivers. After that, the controller may perform initial clock calibration on each of the drivers. Upon completion of the initial clock calibration, the controller sends display data to each of the drivers over the second signal line, to implement the display of an image.

The initial clock calibration refers to an internal clock calibration process performed by the display device before the first operation, and is intended to ensure clock synchronization between the controller and the drivers. In the initial clock calibration process, the controller sends a clock pattern control instruction to the first driver, wherein the control instruction is intended to indicate the first driver to perform clock calibration, and the control instruction carries clock information of the controller; upon receiving the control instruction, the first driver calibrates the clock information of the first driver based on the clock information carried by the control instruction, to synchronize the clock of the first driver with the clock of the controller; and typically upon completion of self-clock calibration, the first driver may send a control response to the controller to indicate the controller to complete the initial clock calibration. An instruction related to the initial clock calibration is typically transmitted over a second signal line (i.e., a differential signal line) between the controller and the first driver.

Figure 10:
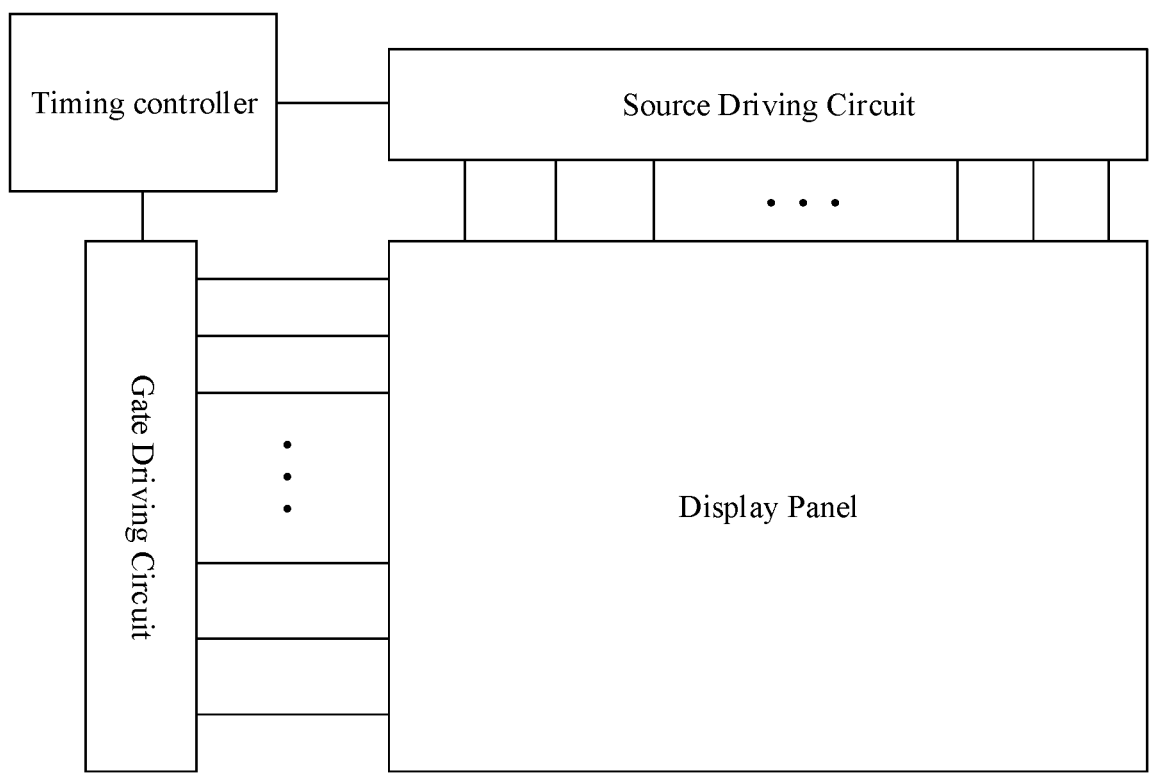
FIG. 10 is a schematic structural diagram of a conventional display device.

Referring to FIG. 10, a schematic structural diagram of a conventional display device is shown. The display device may generally include a display panel and a panel drive circuit for driving the display panel. The panel drive circuit may include a T/CON, a gate drive circuit and a source drive circuit. The gate drive circuit includes a plurality of gate drive chips, and the source drive circuit includes a plurality of source drive chips. The gate drive circuit is operable to perform progressive scanning on each row of pixel units in the display panel; and the source drive circuit is operable to provide a data signal for each column of pixel units in the display panel. A timing controller is respectively connected to the gate drive circuit and the source drive circuit, and is operable to control (i.e. to drive) signals outputted by the gate drive circuit and the source drive circuit.

In view of cost factors, more and more manufacturers utilize the SOC to directly control the display panel. That is, display signals, timing signals, configuration instructions and the like are directly transmitted to the gate drive circuit and source drive circuit of the display panel by the SOC without the T/CON. In this architecture, some or all functions of the T/CON are integrated in the SOC, thereby reducing the overall manufacturing cost of the display device.

Based on such an architecture, a system manufacturer for assembling the display devices typically needs to fully understand the characteristics and configuration parameters of the display panel. Due to different display characteristics of the products from different display panel manufacturers, there is a huge difference in the configuration parameters. Moreover, due to cost or supply or other factors, the same display panel manufacturer may also use drive chips from different manufacturers for the same display panel products, and the differences in different versions of the drive chip may also lead to differences in the configuration parameters. In the related art, when different display panels or drive chips are combined, it is necessary to manually set the configuration parameters on the SOCs, or use different SOCs to mate with different configuration parameters, resulting in the problem of low compatibility of the SOCs. Moreover, as the SOCs are arranged on the boards, different sets of boards need to be provided (that is, the boards, the SOC, and the configuration parameters need to be in a one-to-one corresponding relationship) by using different SOCs to be mated, leading to problems such as large stock cost pressure. With the parameter configuration method according to the embodiments of the present disclosure, the SOC acquires the component information from the drive chip over the first signal line, acquires the corresponding configuration parameters based on the component information, and performs parameters configuration for the plurality of drive chips by using the configuration parameters. By automatic identification and self-adaption of the SOC and the system of the powered-on drive chips, the parameter configuration may be implemented automatically by using the same set of boards, without human intervention required. As a result, the efficiency in parameter configuration and the compatibility of the SOC are improved, and the stock cost is reduced.

Figure 11:
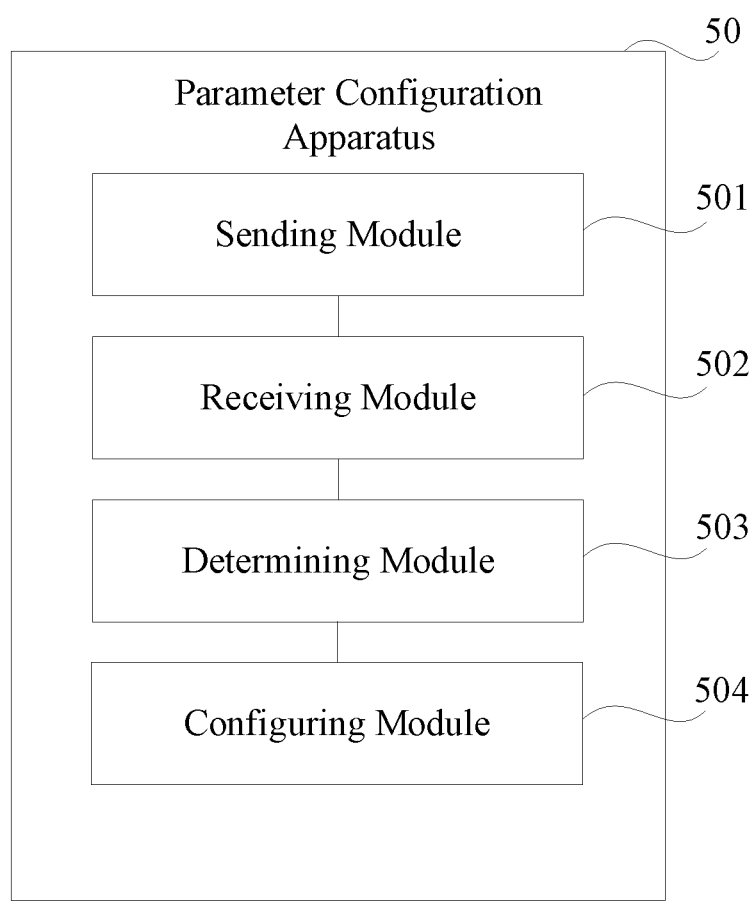
FIG. 11 is a schematic structural diagram of a parameter configuration apparatus according to an exemplary embodiment.

An embodiment of the present disclosure provides a parameter configuration apparatus 50, which is applicable to a controller that is connected to a plurality of drivers. As shown in FIG. 11, the device 50 includes:

a sending module 501, operable to send a component information request instruction to a first driver over a first signal line, wherein the first driver is one of the plurality of drivers;

a receiving module 502, operable to receive a component information response instruction sent by the first driver over the first signal line, wherein the component information response instruction includes component information acquired by the first driver, and the component information response instruction includes component information that includes at least one of information of the first driver and information of components connected to the first driver;

a determining module 503, operable to determine configuration parameters corresponding to the component information; and a configuring module 504, operable to perform parameter configuration for the plurality of drivers by using the determined configuration parameters.

In summary, in the parameter configuration apparatus according to this embodiment of the present disclosure, the receiving module acquires the component information from the first driver over the first signal line; the determining module acquires the corresponding configuration parameters based on the component information; and the configuring module performs parameter configuration for the plurality of drivers by using the configuration parameters. As a result, the parameter configuration may be implemented automatically without human intervention required, and the efficiency in parameter configuration is thus improved.

Optionally, the controller is respectively connected to the plurality of drivers that are connected in parallel by a first signal line, and the first signal line is a signal line for bidirectional signal transmission;

the sending module 501 is operable to:

send the component information request instruction to the first driver over the first signal line, and the receiving module 502 is operable to:

receive the component information response instruction sent by the first driver over the first signal line, wherein the component information response instruction includes the component information.

Optionally, the configuring module 504 is operable to:

perform the parameter configuration for the plurality of drivers by using the determined configuration parameters by the first signal line.

Optionally, each instruction transmitted over the first signal line includes a preamble, a start identifier, data bits, and a stop identifier that are arranged in sequence, wherein the preamble is intended to indicate a receiver to perform clock and phase calibration, the start identifier is intended to indicate a start of data transmission, the data bits are intended to carry data, and the stop identifier is intended to indicate a stop of data transmission.

Optionally, the determining module 503 is operable to:

query a corresponding relationship between the component information and the configuration parameters to obtain the configuration parameters corresponding to the component information.

Optionally, the plurality of drivers are arranged in a display device; the information of the first driver includes at least one of manufacturer information of the driver and version number information of the driver; the components connected to the first driver include a display panel; and information of the display panel includes at least one of manufacturer information of the display panel and version number information of the display panel.

Optionally, the controller is a timing controller or a system on chip (SOC), and the drivers are source drivers, and the controller is respectively connected to the plurality of drivers by a plurality of second signal lines, and a transmission rate of each of the second signal lines is greater than a transmission rate of the first signal line.

In summary, in the parameter configuration apparatus according to this embodiment of the present disclosure, the receiving module acquires the component information from the first driver over the first signal line; the determining module acquires the corresponding configuration parameters based on the component information; and the configuring module configures parameters for the plurality of drivers by using the configuration parameters. As a result, the parameter configuration may be implemented automatically with need of human intervention, and the efficiency in parameter configuration is thus improved.

Figure 12:
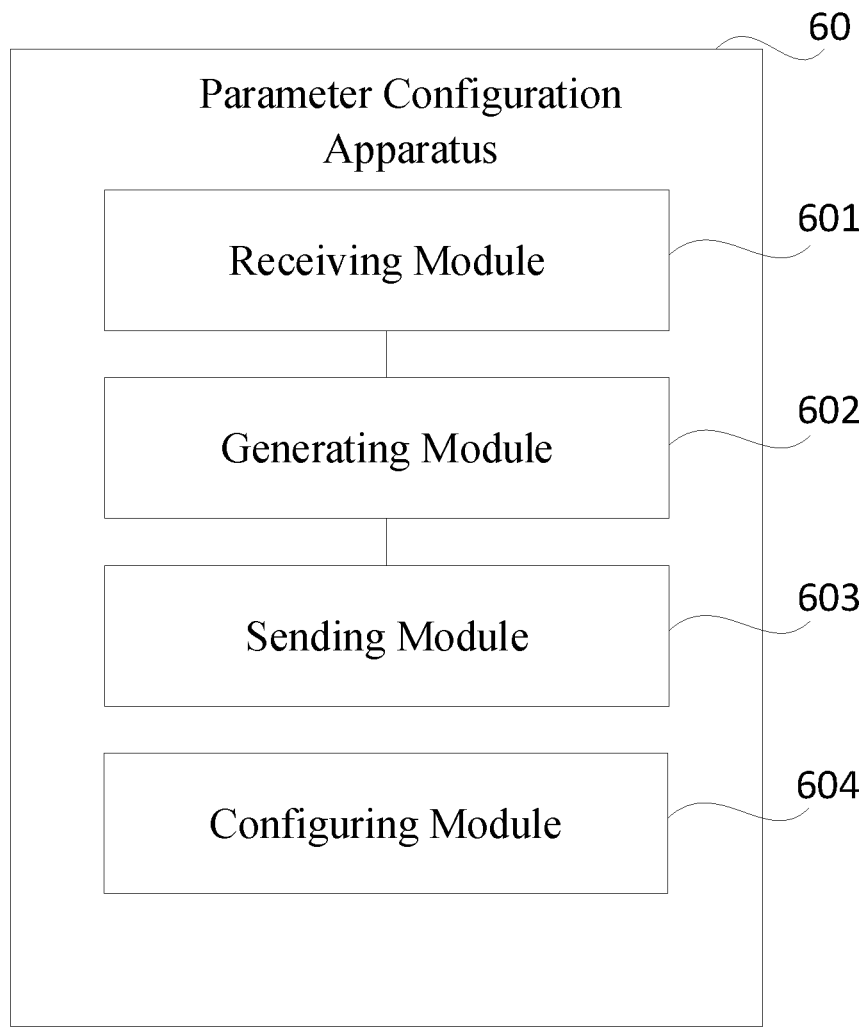
FIG. 12 is a schematic structural diagram of another parameter configuration apparatus according to an exemplary embodiment.

An embodiment of the present disclosure provides a parameter configuration apparatus 60. The parameter configuration apparatus 60 is applicable to a first driver that is one of a plurality of drivers connected in parallel. The plurality of drivers is connected to a controller by a first signal line. As shown in FIG. 12, the device 60 includes:

a receiving module 601, operable to receive the component information request instruction sent by the controller over the first signal line;

a generating module 602, operable to generate a component information response instruction based on the component information request instruction, wherein the component information response instruction includes component information that includes at least one of information of the first driver and information of components connected to the first driver;

a sending module 603, operable to send the component information response instruction to the controller over the first signal line; and a configuring module 604, operable to accept parameter configuration which is performed for the first driver by the controller based on configuration parameters, wherein the configuration parameters correspond to the component information.

In summary, in the parameter configuration apparatus according to this embodiment of the present disclosure, the controller acquires the component information from the first driver over the first signal line, acquires corresponding configuration parameters based on the component information, and performs parameter configuration for the plurality of drivers by using the configuration parameters. As a result, the parameter configuration may be implemented automatically without human intervention required, and the efficiency in parameter configuration is thus improved.

Optionally, the plurality of drivers are respectively connected to the controller by a first signal line, and the first signal line is a signal line for bidirectional signal transmission;

the receiving module 601 is operable to:
receive the component information request instruction sent by the controller over the first signal line; and
the sending module 603 is operable to:
send the component information response instruction to the controller over the first signal line.

Optionally, the configuring module 604 is operable to:
accept the parameter configuration performed for the first driver by the controller based on the configuration parameters, over the first signal line.

Optionally, each instruction transmitted over the first signal line includes a preamble, a start identifier, data bits, and a stop identifier that are arranged in sequence, wherein the preamble is intended to indicate a receiver to perform clock and phase calibration, the start identifier is intended to indicate a start of data transmission, the data bits are intended to carry data, and the stop identifier is intended to indicate a stop of data transmission.

Optionally, the plurality of drivers are arranged in a display device; the information of the first driver includes at least one of manufacturer information of the driver and version number information of the driver; the components connected to the first driver include a display panel; and information of the display panel includes at least one of manufacturer information of the display panel and version number information of the display panel.

Figure 13:
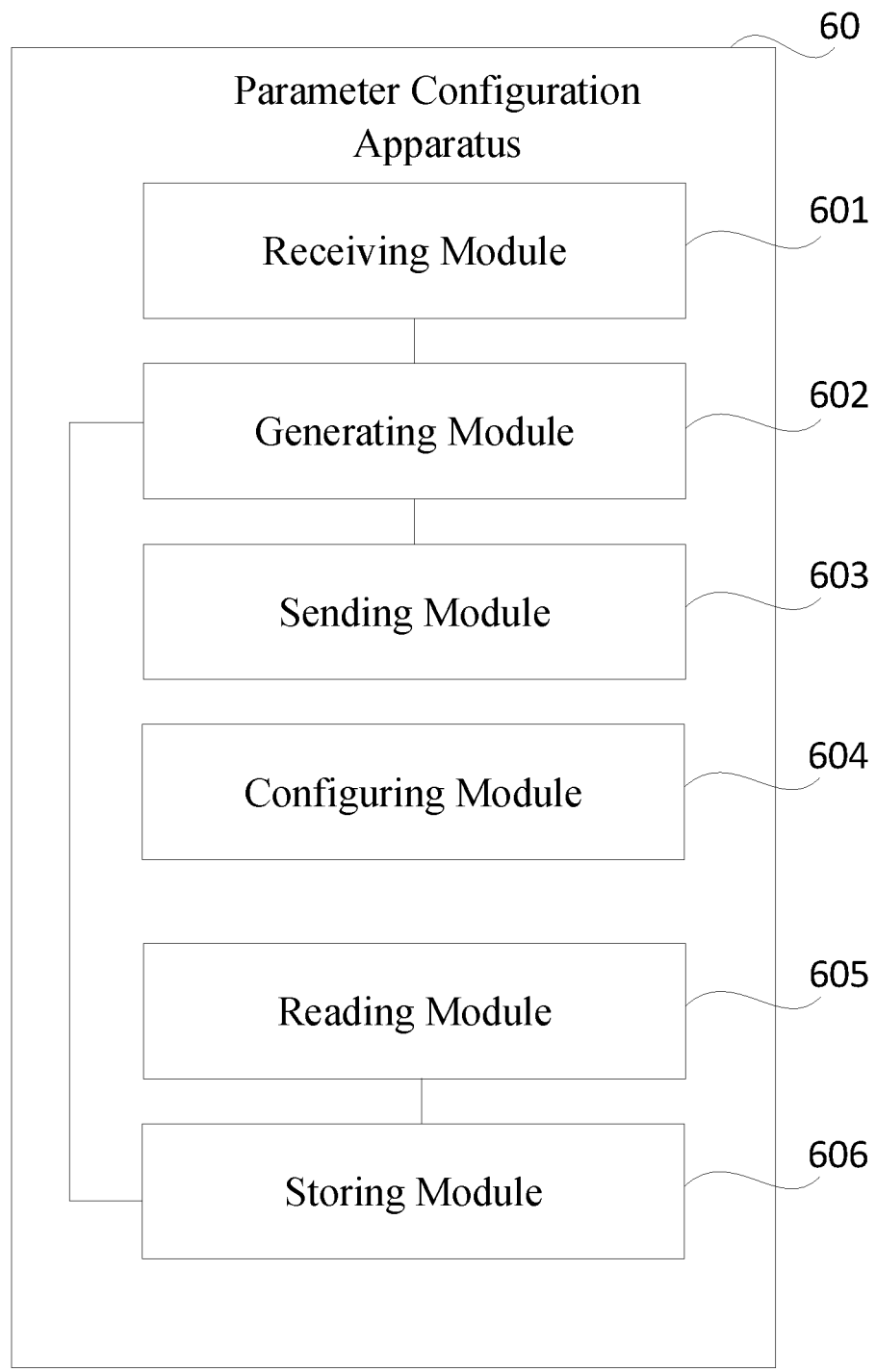
FIG. 13 is a schematic structural diagram of a yet another parameter configuration apparatus according to an exemplary embodiment.

The first driver is further connected to a target printed circuit board (PCB); information of the display panel is identified by a level of a target pin on the target PCB; and the target pin is at least one of pins connected to the first driver. As shown in FIG. 13, the device 60 further includes:

a reading module 605, operable to read the level of the target pin after the first driver is powered on, to obtain the information of the display panel; and a storing module 606, operable to store the information of the display panel at a target storage address of the first driver, wherein the target storage address is intended to store the component information.

Optionally, the information of the first driver is written at the target storage address before the first driver is assembled into the display device.

Optionally, the controller is a timing controller, and the drivers are source drivers or SOCs; and the controller is respectively connected to the plurality of drivers by a plurality of second signal lines, and a transmission rate of each of the second signal lines is greater than a transmission rate of the first signal line.

Figure 14:
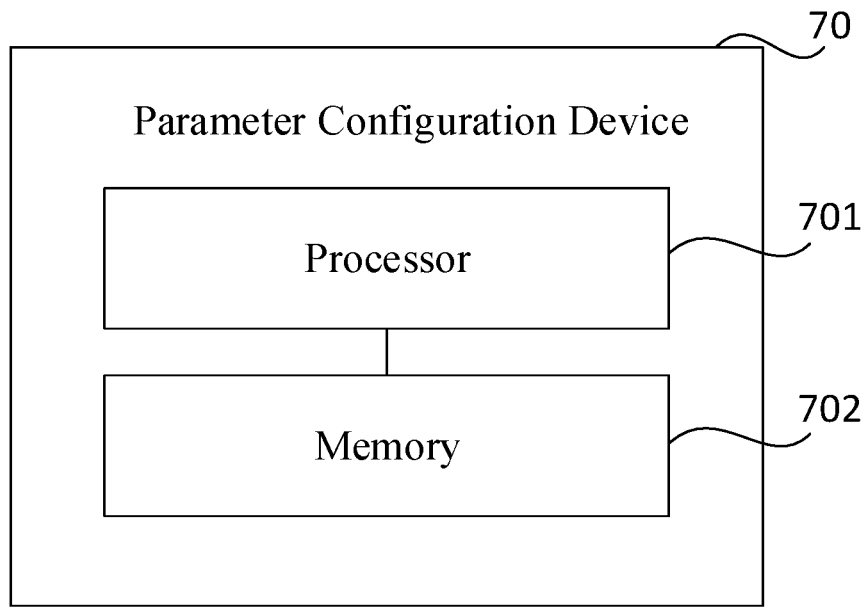
FIG. 14 is a schematic structural diagram of a parameter configuration device according to an exemplary embodiment.

An embodiment of the present disclosure provides a parameter configuration device 70, as shown in FIG. 14. The parameter configuration device is applicable to a controller connected to a plurality of drivers, and the device 70 includes:

a processor 701; and a memory 702, operable to store at least one executable instruction of the processor;

the processor is operable to perform the parameter configuration method performed by the controller according to the embodiments of the present disclosure when the at least one executable instruction is executed by the processor.

Figure 15:
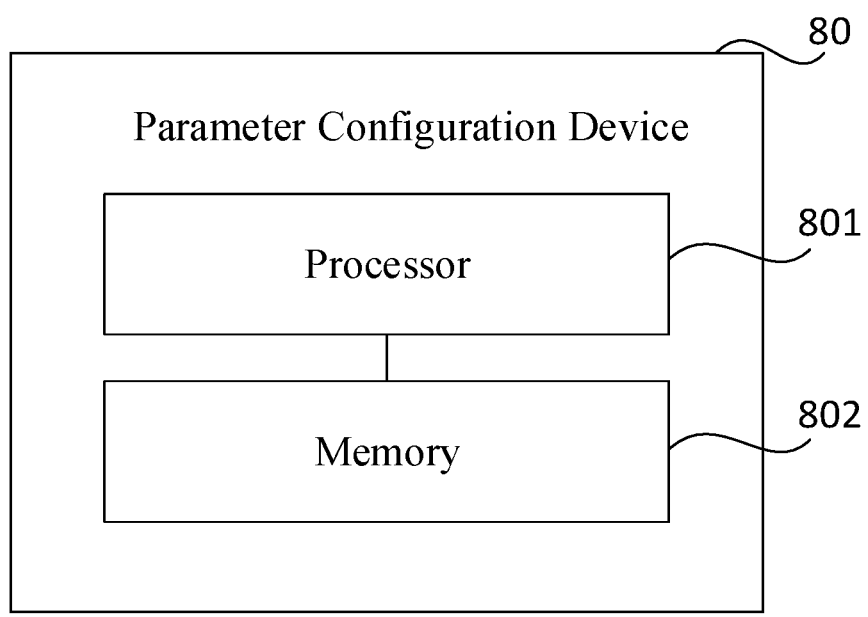
FIG. 15 is a schematic structural diagram of another parameter configuration device according to another exemplary embodiment.

An embodiment of the present disclosure provides a parameter configuration device 80. The parameter configuration device 80 is applicable to a first driver that is one of a plurality of drivers connected in parallel. The plurality of drivers are connected to a controller by a first signal line. As shown in FIG. 15, the device 80 includes:

a processor 801; and a memory 802, operable to store at least one executable instruction of the processor;

the processor is operable to perform the parameter configuration method performed by the first driver according to the embodiments of the present disclosure when the at least one executable instruction is executed by the processor.

An embodiment of the present disclosure provides a display device. The display device includes a display panel, a controller, and a plurality of drivers; the plurality of drivers may be connected in parallel, and are connected to the controller by a first signal line.

Optionally, the controller is connected to the plurality of drivers by a plurality of second signal lines in a one-to-one corresponding relationship, and a reference may be made to FIG. 1 or FIG. 2 for a connection relationship between the controller and the plurality of drivers. Further, the controller is arranged on a board, and the drivers are arranged on the display panel or on a flexible substrate connected to the display panel.

In an optional implementation, the display device may be a part having a display function. As an example, the display device may be a display (also referred to as a display screen), which includes at least: a display panel, a controller, and a plurality of drivers. For example, the display device is a liquid crystal display or an OLED display. In another optional implementation, the display device may be a product having a display function. As an example, the display device may be a piece of electronic paper, a mobile phone, a tablet computer, a television, a notebook computer, a digital photo frame, a navigator, and any product having a display function.

The controller includes the parameter configuration apparatus 50 described in FIG. 11, and the plurality of drivers include the parameter configuration apparatus 60 described in FIG. 12 or FIG. 13.

Alternatively, the controller includes a parameter configuration device 70 shown in FIG. 14, and the plurality of drivers include a parameter configuration device 80 shown in FIG. 15.

Figure 16:
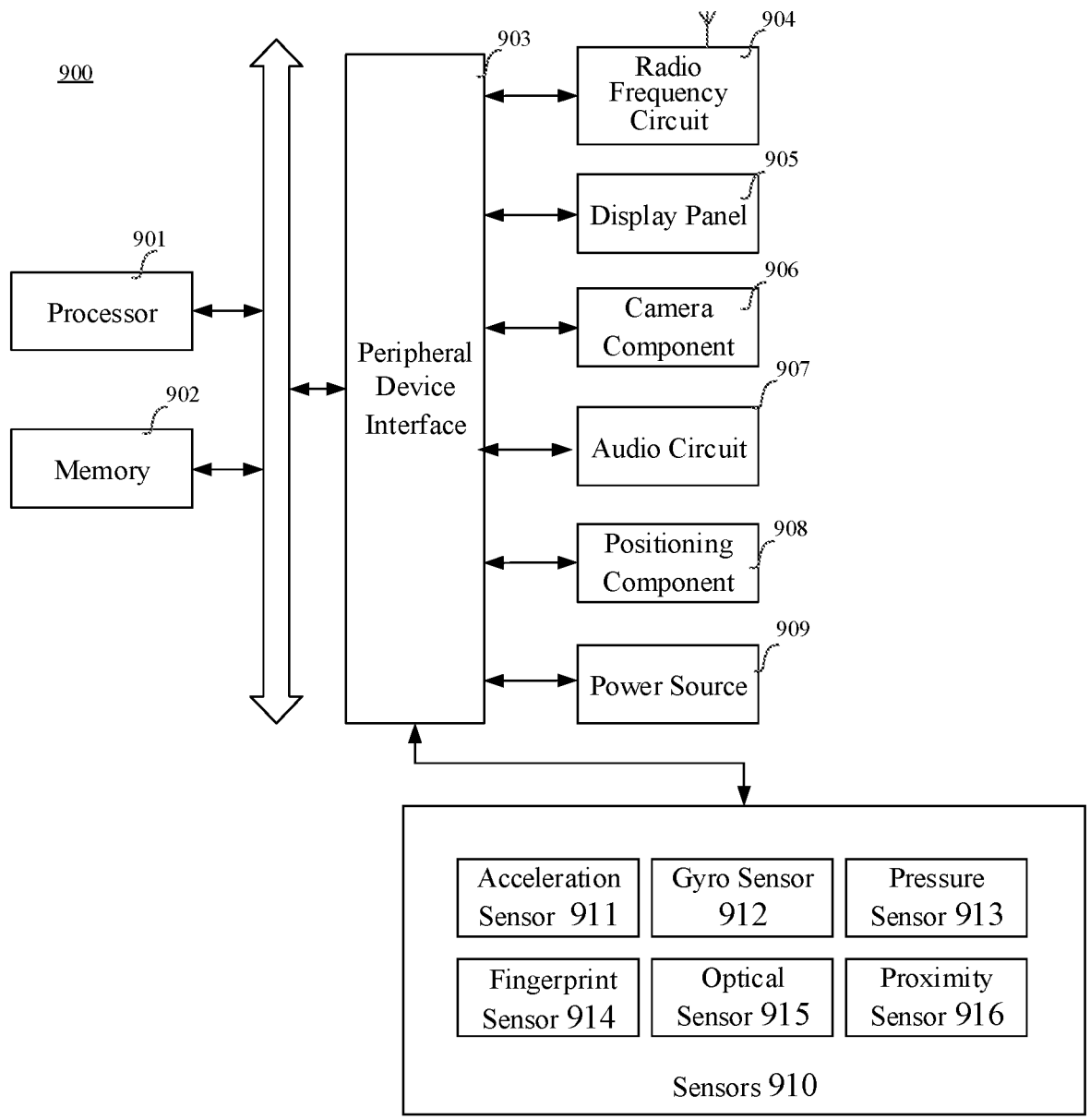
FIG. 16 shows a structural block diagram of a display device according to an exemplary embodiment of the present disclosure.

FIG. 16 shows a structural block diagram of a display device 900 according to an exemplary embodiment of the present disclosure. The device 900 may be a smart phone, a tablet computer, a television, a notebook computer or a desktop computer. The device 900 typically includes a processor 901 and a memory 902.

The processor 901 may include at least one processing core, such as a 4-core processor and an 8-core processor. The processor 901 may be practiced by at least one of hardware forms of a digital signal processing (DSP), a field-programmable gate array (FPGA), and a programmable logic array (PLA). The processor 901 may also include a main processor and a coprocessor. The main processor is a processor for processing data in an awaken state, and is also referred to as central processing unit (CPU). The coprocessor is a low-power consumption processor for processing data in a standby state. In some embodiments, the processor 901 may be integrated with a graphics processing unit (GPU), which is responsible for rendering and drawing of content that needs to be displayed on a display panel. In some embodiments, the processor 901 may further include an artificial intelligence (AI) processor, operable to process computational operations related to machine learning.

The memory 902 can include at least one computer readable storage medium, which may be non-transitory. The memory 902 may also include a high-speed random-access memory, and a non-volatile memory such as at least one magnetic disk storage devices and flash memory storage devices. In some embodiments, the non-transitory computer readable storage medium in the memory 902 is operable to store at least one instruction. The at least one instruction is operable to be executed by the processor 901 to perform the parameter configuration method according to the method embodiments of the present disclosure.

In some embodiments, the device 900 optionally further includes a peripheral device interface 903 and at least one peripheral device. The processor 901, the memory 902, and the peripheral device interface 903 may be connected by a bus or a signal line. Each peripheral device may be connected to the peripheral device interface 903 by a bus, a signal line, or a circuit board. Specifically, the peripheral device includes at least one of a radio frequency circuit 904, a display panel 905, a camera 906, an audio circuit 907, a positioning component 908, and a power source 909.

The peripheral device interface 903 may be operable to connect at least one input/output (I/O) associated peripheral device to the processor 901 and the memory 902. In some embodiments, the processor 901, the memory 902, and the peripheral interface 903 are integrated on the same chip or circuit board. In some other embodiments, any one or two of the processor 901, the memory 902, and the peripheral interface 903 may be practiced on a separate chip or circuit board, which is not limited in the present embodiment.

The radio frequency circuit 904 is operable to receive and transmit an radio frequency (RF) signal, also referred to as an electromagnetic signal. The radio frequency circuit 904 communicates with the communication network and other communication devices via the electromagnetic signal. The radio frequency circuit 904 converts the electrical signal into the electromagnetic signal for sending, or converts the received electromagnetic signal into the electrical signal. Optionally, the radio frequency circuit 904 includes an antenna system, an RF transceiver, at least one amplifier, a tuner, an oscillator, a digital signal processor, a coding and decoding chipset, a subscriber identity module card, and the like. The radio frequency circuit 904 can communicate with other devices through at least one wireless communication protocol. The wireless communication protocol includes, but not limited to, the world wide web, a metropolitan area network, an intranet, various generations of mobile communication networks (2G, 3G, 4G, and 5G), a wireless local area network, and/or a wireless fidelity (Wi-Fi) network. In some embodiments, the radio frequency circuit 904 may also include a near field communication (NFC) related circuit, which is not limited in the present disclosure.

The display panel 905 is operable to display a user interface (UI). The UI can include graphics, texts, icons, videos, and any combination thereof. When the display panel 905 is a touch display panel, the display panel 905 also has the capability of capturing a touch signal on the surface or over the surface of the display panel 905. The touch signal may be input to the processor 901 as a control signal for processing. At this point, the display panel 905 may also be operable to provide virtual buttons and/or a virtual keyboard, which are also referred to as soft buttons and/or soft keyboard. In some embodiments, one display panel 905 is arranged, and arranged at the front panel of the device 900. In other embodiments, at least two display panels 905 are arranged, and are respectively arranged on different surfaces of the device 900 or in a folded design. In still other embodiments, the display panel 905 may be a flexible display panel arranged on a curved surface or folded surface of the device 900. The display panel 905 may even be set to a non-rectangular irregular pattern, that is, irregular screen. The display panel 905 may include an LCD display panel or an OLED display panel.

The camera component 906 is operable to capture images or videos. Optionally, the camera component 906 includes a front camera and a rear camera. Typically, the front camera is arranged on the front panel of the device and the rear camera is arranged on the back surface of the device. In some embodiments, at least two rear cameras are arranged and are respectively any one type of a main camera, a depth camera, a wide-angle camera, and a telephoto camera, so as to realize the background blur function realized by fusion of the main camera and the depth camera, the panoramic shooting and virtual reality (VR) shooting realized by fusion of the main camera and the wide-angle camera, or other fused shooting functions. In some embodiments, the camera component 906 may also include a flash. The flash may be a monochrome temperature flash or a two-color temperature flash. The two-color temperature flash is a combination of a warm flash and a cool flash and may be used for light compensation at different color temperatures.

The audio circuit 907 may include a microphone and a loudspeaker. The microphone is operable to collect sound waves of the user and the environment, and convert the sound waves into electrical signals for being input to the processor 901 for processing, or being input to the radio frequency circuit 904 for voice communication. For the purpose of stereo acquisition or noise reduction, a plurality of microphones may be arranged, and are respectively arranged at different portions of the device 900. The microphone may also be an array microphone or an omnidirectional acquisition microphone. The loudspeaker is then operable to convert the electrical signals from the processor 901 or the radio frequency circuit 904 into the sound waves. The loudspeaker may be a conventional film loudspeaker or a piezoelectric ceramic loudspeaker. When the loudspeaker is the piezoelectric ceramic loudspeaker, not only can the electrical signals be converted into the sound waves audible to humans, but also the electrical signals may be converted into the sound waves inaudible to humans for the purpose such as ranging. In some embodiments, the audio circuit 907 may also include a headphone jack.

The positioning component 908 is operable to position the current geographic location of the device 900 to implement navigation or location based services (LBS). The positioning component 908 may be a positioning component based on the global positioning system (GPS) from the United States, the Beidou positioning system from China, or the Grenas satellite positioning system from Russia.

The power source 909 is operable to supply power for various components in the device 900. The power source 909 may be an alternating current, a direct current, a disposable battery, or a rechargeable battery. When the power source 909 includes the rechargeable battery, the rechargeable battery may be a wired rechargeable battery or a wireless rechargeable battery. The wired rechargeable battery is a battery that is recharged by a wired line. The wireless rechargeable battery is a battery that is recharged by wireless coil. The rechargeable battery may also be operable to support the fast charging technology.

In some embodiments, the device 900 also includes at least one sensors 910. The at least one sensors 910 include, but not limited to, an acceleration sensor 911, a gyro sensor 912, a pressure sensor 913, a fingerprint sensor 914, an optical sensor 915, and a proximity sensor 916.

The acceleration sensor 911 may detect the size of the acceleration on the three coordinate axes of a coordinate system established by the device 900. For example, the acceleration sensor 911 may be operable to detect the components of gravity acceleration on the three coordinate axes. The processor 901 may control the touch display panel 905 to display a user interface in a landscape view or a portrait view according to the gravity acceleration signal collected by the acceleration sensor 911. The acceleration sensor 911 may also be used for collecting game or user motion data.

The gyro sensor 912 may detect the body direction and the rotation angle of the device 900, and the gyro sensor 912 may cooperate with the acceleration sensor 911 to collect the 3D motion of the user on the device 900 synergistically. According to the data collected by the gyro sensor 912, the processor 901 may implement the following functions of motion sensing (for example, changing the UI according to the tilting operation of the user), image stabilization at the time of shooting, game control, and inertial navigation.

The pressure sensor 913 may be arranged on a side frame of the device 900 and/or a lower layer of the touch display panel 905. When the pressure sensor 913 is arranged on the side frame of the device 900, the holding signal of the user for the device 900 may be detected, and the processor 901 performs left and right-hand recognition or shortcut operation according to the holding signal collected by the pressure sensor 913. When the pressure sensor 913 is arranged on the lower layer of the touch display panel 905, the processor 901 controls an operability control on the UI interface according to the pressure operation of the user on the touch display panel 905. The operability control includes at least one of a button control, a scroll bar control, an icon control, and a menu control.

The fingerprint sensor 914 is operable to collect the fingerprint of the user, and the processor 901 identifies the identity of the user according to the fingerprint collected by the fingerprint sensor 914, or the fingerprint sensor 914 identifies the identity of the user according to the collected fingerprint. When identifying that the identity of the user is a trusted identity, the processor 901 authorizes the user to perform related sensitive operations, including unlocking the screen, viewing encrypted information, downloading software, paying and changing settings, and the like. The fingerprint sensor 914 may be arranged on the front, back or side surface of the device 900. When the device 900 is provided with a physical button or manufacturer logo, the fingerprint sensor 914 may be integrated with a physical button or vendor logo.

The optical sensor 915 is operable to collect ambient light intensity. In one embodiment, the processor 901 may control the display brightness of the touch display panel 905 based on the ambient light intensity collected by the optical sensor 915. Specifically, when the ambient light intensity is relatively high, the display brightness of the touch display panel 905 is raised. When the ambient light intensity is relatively low, the display brightness of the touch display panel 905 is lowered. In another embodiment, the processor 901 may also dynamically adjust the shooting parameters of the camera component 906 based on the ambient light intensity collected by the optical sensor 915.

The proximity sensor 916, also referred to as a distance sensor, is typically arranged on the front panel of the device 900. The proximity sensor 916 is operable to capture the distance between the user and the front surface of the device 900. In one embodiment, when the proximity sensor 916 detects that the distance between the user and the front surface of the device 900 gradually decreases, the touch screen 905 is controlled by the processor 901 to switch from a bright screen state to a dark screen state. When the proximity sensor 916 detects that the distance between the user and the front surface of the device 900 gradually increases, the processor 901 controls the touch display panel 905 to switch from the dark screen state to the bright screen state.

It will be understood by those skilled in the art that the structure shown in FIG. 16 does not constitute a limitation on the device 900, and may include more or less components than those illustrated, or combine some components or adopt different component arrangements.

An embodiment of the present disclosure provides a readable storage medium storing instructions therein. When the readable storage medium operates in a processing component, the processing component may perform the parameter configuration method according to the embodiments of the present disclosure.

An embodiment of the present disclosure provides a chip. The chip includes a programmable logic circuit and/or program instruction. The chip is operable to perform the parameter configuration method according to the embodiments of the present disclosure when the chip operates.

An embodiment of the present disclosure also provides a computer program product storing instructions therein. When the computer program product runs on a computer, the computer is caused to perform the parameter configuration method according to the embodiments of the present disclosure.

With regard to the device in the aforesaid embodiments, the specific manner in which the respective modules perform the operations has been described in detail in embodiments of the method, and will not be explained in detail herein.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure is only limited by the appended claims.

What is claimed is:

1. A parameter configuration method, applicable to a controller that is respectively connected to a plurality of drivers, the method comprising:
   sending a component information request instruction to a first driver, wherein the first driver is one of the plurality of drivers;
   receiving a component information response instruction sent by the first driver, wherein the component information response instruction comprises component information that comprises at least one of information of the first driver and information of components connected to the first driver;
   determining configuration parameters corresponding to the component information; and
   performing parameter configuration for the plurality of drivers by using the determined configuration parameters,
   wherein the controller is respectively connected to the plurality of drivers that are connected in parallel by a first signal line, the first signal line being a signal line for bidirectional signal transmission;
   sending the component information request instruction to the first driver comprises: sending the component information request instruction to the first driver over the first signal line; and
   receiving the component information response instruction sent by the first driver comprises: receiving the component information response instruction sent by the first driver over the first signal line
   wherein each instruction transmitted over the first signal line comprises a preamble, a start identifier, data bits, and a stop identifier that are arranged in sequence, wherein the preamble is intended to indicate a receiver to perform clock and phase calibration, the start identifier is intended to indicate a start of data transmission, the data bits are intended to carry data, and the stop identifier is intended to indicate a stop of data transmission.

2. The method according to claim 1, wherein
   performing the parameter configuration for the plurality of drivers by using the determined configuration parameters comprises:
   performing the parameter configuration for the plurality of drivers by using the determined configuration parameters by the first signal line.

3. The method according to claim 1, wherein determining the configuration parameters corresponding to the component information comprises:
   querying a corresponding relationship between the component information and the configuration parameters to obtain the configuration parameters corresponding to the component information.

4. The method according to claim 1, wherein the plurality of drivers are arranged in a display device; the information of the first driver comprises at least one of manufacturer information of the driver and version number information of the driver; the components connected to the first driver comprise a display panel; and information of the display panel comprises at least one of manufacturer information of the display panel and version number information of the display panel.

5. The method according to claim 1, wherein the controller is a timing controller or a system on chip (SOC), the drivers are source drivers, and
   the controller is respectively connected to the plurality of drivers by a plurality of second signal lines, and a transmission rate of each of the second signal lines is greater than a transmission rate of the first signal line.

6. A parameter configuration method, applicable to a first driver that is one of a plurality of drivers, the plurality of drivers being respectively connected to a controller, the method comprising:
   receiving a component information request instruction sent by the controller;
   generating a component information response instruction based on the component information request instruction, wherein the component information response instruction comprises component information that comprises at least one of information of the first driver and information of components connected to the first driver;
   sending the component information response instruction to the controller;
   accepting parameter configuration performed for the first driver by the controller based on configuration parameters, wherein the configuration parameters correspond to the component information,
   wherein the plurality of drivers are respectively connected to the controller by a first signal line, the first signal line being a signal line for bidirectional signal transmission;
   receiving the component information request instruction sent by the controller comprises: receiving the component information request instruction sent by the controller over the first signal line; and
   sending the component information response instruction to the controller comprises: sending the component information response instruction to the controller over the first signal line;
   wherein each instruction transmitted over the first signal line comprises a preamble, a start identifier, data bits, and a stop identifier that are arranged in sequence, wherein the preamble is intended to instruct a receiver to perform clock and phase calibration, the start identifier is intended to indicate a start of data transmission, the data bits are intended to carry data, and the stop identifier is intended to indicate a stop of data transmission.

7. The method according to claim 6, wherein
accepting the parameter configuration performed for the first driver by the controller based on the configuration parameters comprises:
accepting the parameter configuration performed for the first driver by the controller based on the configuration parameters over the first signal line.

8. The method according to claim 6, wherein the plurality of drivers are arranged in a display device; the information of the first driver comprises at least one of manufacturer information of the driver and version number information of the driver; the components connected to the first driver comprise a display panel; and information of the display panel comprises at least one of manufacturer information of the display panel and version number information of the display panel.

9. The method according to claim 8, wherein the first driver is further connected to a target printed circuit board (PCB), information of the display panel is identified by a level of a target pin on the target PCB, the target pin is at least one of pins connected to the first driver, the method further comprising:
reading the level of the target pin after the first driver is powered on, to obtain the information of the display panel;
storing the information of the display panel at a target storage address of the first driver, wherein the target storage address is intended to store the component information.

10. The method according to claim 8, wherein the information of the first driver is written at the target storage address before the first driver is assembled into the display device.

11. The method according to claim 6, wherein the controller is a timing controller, and the drivers are source drivers or SOCs; and
the controller is respectively connected to the plurality of drivers by a plurality of second signal lines, and a transmission rate of each of the second signal lines is greater than a transmission rate of the first signal line.

12. A parameter configuration device, applicable to a controller that is respectively connected to a plurality of drivers, the device comprising:
a processor;
a memory, operable to store at least one executable instruction of the processor,
wherein the processor is operable to perform the parameter configuration method as defined in claim 1.

13. A parameter configuration device, applicable to a first driver that is one of a plurality of drivers, the plurality of drivers being respectively connected to a controller, the device comprising:

a processor;
a memory, operable to store at least one executable instruction of the processor,
wherein the processor is operable to perform the parameter configuration method as defined in claim 6.

14. A display device, wherein the display device comprises a display panel, a controller, and a plurality of drivers;
wherein the plurality of drivers are connected to the controller; the plurality of drivers comprise the parameter configuration device as defined in claim 13; and
the controller comprises a parameter configuration device, applicable to a controller that is respectively connected to a plurality of drivers, the device comprising:
a processor;
a memory, operable to store at least one executable instruction of the processor, wherein the processor is operable to:
send a component information request instruction to a first driver, wherein the first driver is one of the plurality of drivers;
receive a component information response instruction sent by the first driver, wherein the component information response instruction comprises component information that comprises at least one of information of the first driver and information of components connected to the first driver;
determine configuration parameters corresponding to the component information; and
perform parameter configuration for the plurality of drivers by using the determined configuration parameters.

15. A non-transitory computer-readable storage medium storing instructions therein, wherein when running on a processing component, the computer-readable storage medium causes the processing component to perform the parameter configuration method as defined in claim 8, or
causes the processing component to perform a parameter configuration method applicable to a controller that is respectively connected to a plurality of drivers, the method comprising:
sending a component information request instruction to a first driver, wherein the first driver is one of the plurality of drivers;
receiving a component information response instruction sent by the first driver, wherein the component information response instruction comprises component information that comprises at least one of information of the first driver and information of components connected to the first driver;
determining configuration parameters corresponding to the component information; and
performing parameter configuration for the plurality of drivers by using the determined configuration parameters.

* * * * *